United States Patent
Komatsu et al.

(10) Patent No.: US 7,129,650 B2
(45) Date of Patent: Oct. 31, 2006

(54) LIGHTING APPARATUS FOR HIGH INTENSITY DISCHARGE LAMP

(75) Inventors: Naoki Komatsu, Kobe (JP); Masanori Mishima, Souraku-gun (JP); Minoru Maehara, Matsubara (JP); Satoru Nagata, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/526,446

(22) PCT Filed: Mar. 31, 2004

(86) PCT No.: PCT/JP2004/004745

§ 371 (c)(1),
(2), (4) Date: Mar. 3, 2005

(87) PCT Pub. No.: WO2004/091263

PCT Pub. Date: Oct. 21, 2004

(65) Prior Publication Data

US 2005/0269963 A1    Dec. 8, 2005

(30) Foreign Application Priority Data

Apr. 1, 2003 (JP) ............................. 2003-098014

(51) Int. Cl.
    *G05F 1/00* (2006.01)
(52) U.S. Cl. .................. 315/291; 315/209 R; 315/244; 315/227 R; 315/DIG. 5; 315/DIG. 7
(58) Field of Classification Search ........... 315/209 R, 315/291, 307, 200 R, 225, 227 R, 244, 219, 315/289, 276, DIG. 5, DIG. 7; 363/34, 37, 363/40, 131
See application file for complete search history.

(56) References Cited

U.S. PATENT DOCUMENTS

| | | | | |
|---|---|---|---|---|
| 4,904,903 | A | * | 2/1990 | Pacholok ................. 315/209 R |
| 5,010,279 | A | * | 4/1991 | Lathom et al. .......... 315/227 R |
| 5,739,644 | A | * | 4/1998 | Bernitz et al. ............... 315/289 |
| 5,875,107 | A | * | 2/1999 | Nagai et al. ................. 363/131 |
| 6,018,220 | A | * | 1/2000 | Nerone ........................ 315/219 |

(Continued)

FOREIGN PATENT DOCUMENTS

| CA | 2255512 | 2/2004 |
|---|---|---|
| JP | 2948600 | 2/1991 |

OTHER PUBLICATIONS

English Language Abstract of JP 3-03029, Aug. 2, 1991.

*Primary Examiner*—Haissa Philogene
(74) *Attorney, Agent, or Firm*—Greenblum & Bernstein, P.L.C.

(57) ABSTRACT

A lighting apparatus of high intensity discharge lamp comprises a DC power source, a series connection of a first and a second transistors; a series connection of a first and a second capacitors connected in parallel with the series connection of the transistors; a series connection including at least an inductor and a discharge lamp connected between a connection point of the transistors and another connection point of the capacitors, and a control circuit for switching on and off of the transistors so as to supply electric power to the discharge lamp. A voltage of the first capacitor is set to be higher than that of the second capacitor corresponding to the capacitances of the first and second capacitors. Thus, the pulse height in negative or positive phase of the rectangular alternating voltage applied to the discharge lamp can be increased without increasing the output voltage from the DC power source.

25 Claims, 37 Drawing Sheets

U.S. PATENT DOCUMENTS

| | | | |
|---|---|---|---|
| 6,020,691 A | 2/2000 | Sun et al. | 315/307 |
| 6,075,715 A * | 6/2000 | Maehara et al. | 363/37 |
| 6,144,172 A | 11/2000 | Sun | 315/291 |
| 6,459,215 B1 * | 10/2002 | Nerone et al. | 315/291 |

* cited by examiner

PRIOR ART

PRIOR ART

PRIOR ART

US 7,129,650 B2

LIGHTING APPARATUS FOR HIGH INTENSITY DISCHARGE LAMP

TECHNICAL FIELD

The present invention relates to a lighting apparatus of high intensity discharge lamp having a circuitry called half-bridge circuit.

BACKGROUND ART

A circuitry of a conventional lighting apparatus of high intensity discharge lamp is described with reference to FIGS. 49 to 51.

As shown in FIG. 49, the lighting apparatus comprises a DC power supply 1A, a series connection of transistors (MOS-FET) Q1 and Q2, and a series connection of capacitors C1 and C2 which is connected in parallel with the series connection of transistors Q1 and Q2. The lighting apparatus further comprises a series connection of an inductor L1, an ignitor 2, a high intensity discharge lamp (high-luminance discharge lamp) DL and a resistor R1, which is connected between a connection point of the transistors Q1 and Q2 and another connection point of the capacitors C1 and C2. Another capacitor C3 is connected in parallel with a series connection of the ignitor 2, the discharge lamp DL and the resistor R1. The lighting apparatus further comprises a voltage sensing circuit 4, a current sensing circuit 9 and a control circuit 3.

The DC power supply 1A comprises a diode bridge connection DB serving as a full wave rectifier rectifying AC voltage of commercial power source Vs to DC voltage, a boosting chopper 11 constituted by an inductor L11, a transistor Q11 and a diode D11, and a control circuit 12 sensing an output of the boosting chopper 11 and controlling on and off of the transistor Q11 so as to make the voltage of the output of the boosting chopper 11 be a predetermined value.

The ignitor 2 is constituted by a pulse transformer PT and so on which applies a high pulse voltage to the discharge lamp DL while the discharge lamp DL is not lighted. The voltage sensing circuit 4 senses a voltage value applied to the discharge lamp DL. The current sensing circuit 9 senses a current value flowing to the discharge lamp DL from the resistor R1.

The control circuit 3 controls switching on and off of the transistors Q1 and Q2 as shown in FIGS. 50 and 51 so as to supply an electric power to the discharge lamp DL, in which voltage of the electric power has low frequency of rectangular pulse. The control circuit 3 is constituted by a power sensing circuit 330 which calculates an electric power necessary for lighting the discharge lamp DL from sensing results of the voltage sensing circuit 4 and the current sensing circuit 9, and a driving circuit 33 which drives the transistors Q1 and Q2 corresponding to the calculation result.

While the discharge lamp DL is not lighted, the transistors Q1 and Q2 are alternately switched off with a low frequency, but the transistor Q1 is frequently switched on and off with a high frequency in a term T1 while the transistor Q2 is switched off, and the transistor Q2 is frequently switched on and off with a high frequency while the transistor Q1 is switched off, as shown in FIG. 50. By such switching operations, a rectangular alternating voltage $V_{DL}$ having a low frequency is generated. The alternating voltage $V_{DL}$, on which alternating voltages $V_P$ of several kV outputted from the ignitor 2 are further superimposed, is applied to the discharge lamp DL.

When the discharge lamp DL is lighted, a proper rectangular alternating voltage is supplied to the discharge lamp DL, as shown in FIG. 51 owing to similar switching operations. The high frequency of the switching on and off of the transistors Q1 and Q2 is several tens kHz, and the low frequency of the switching on and off of the transistors Q1 and Q2 is defined by a frequency of a term addition of the terms T1 and T2, which is generally in a range from several tens Hz to several hundreds Hz.

The voltage applied to the discharge lamp DL while the discharge lamp DL is not lighted, however, becomes a half of the voltage E outputted from the DC power supply 1A, as shown in FIG. 50. In the high intensity discharge lamp, it is necessary to apply a no-load voltage of about 250V to 450V to both terminals of the discharge lamp while the discharge lamp is not lighted in order to make the transition from glow discharge to arc discharge smoothly, after starting up of the lighting of the discharge lamp. Thus, the voltage E outputted from the DC power supply 1A must be increased to two-fold of the above-mentioned no-load voltage. It causes the increase of stresses and the upsizing of elements of the lighting apparatus.

Another conventional lighting apparatus of high intensity discharge lamp is described with reference to FIGS. 52 to 54, which is, for example, shown in Japanese patent No. 2948600.

As shown in FIG. 52, the lighting apparatus comprises a DC power source 1, a series connection of transistors (bipolar transistors) Tr1 and Tr2, and a series connection of capacitors C1 and C2 which is connected in parallel with the series connection of the transistors Tr1 and Tr2. The capacitors C1 and C2 have the same capacitance. The lighting apparatus further comprises a series connection of an inductance L1 and a high intensity discharge lamp DL which is connected between a connection point of the transistors Tr1 and Tr2 and another connection point of the capacitors C1 and C2, a capacitor C3 connected in parallel with the discharge lamp DL, and diodes D1 and D2 which are connected back to back with the transistors Tr1 and Tr2. Control signals shown in FIG. 53 are respectively supplied to control terminals of the transistors Tr1 and Tr2. The capacitors C1 and C2 are respectively applied to about a half of the voltage of the DC power source 1 so as to be charged.

In terms T1 and T3 shown in FIG. 53, the transistors Tr1 and Tr2 are alternately switched on and off. Thus, high frequency alternating voltages $V_P$ shown in FIG. 54 are applied to the discharge lamp DL. In a term T2, the transistor Tr1 is high frequently switched on and off while the transistor Tr2 is switched off, so that a positive DC voltage $V_{DL}$ is applied to the discharge lamp DL. In a term T4, the transistor Tr2 is high frequently switched on and off while the transistor Tr1 is switched off, so that a negative DC voltage $V_{DL}$ is applied to the discharge lamp DL.

By selecting the frequency of switching on and off of the transistors Tr1 and Tr2 in the high frequency state to be a value near to a resonance frequency of the inductor L1 and the capacitor C3 in no-loaded state, it is possible to generate a high voltage which is sufficient to start up the lighting of the discharge lamp can be generated by the inductor L1 and the capacitor C3.

In such the conventional lighting apparatus, even though a half of the voltage E outputted from the DC power source 1 is applied to the discharge lamp DL, the no-load voltage which is sufficiently higher can be applied to the discharge lamp DL with utilizing resonance of the inductor L1 and the capacitor C3. There, however, is a problem that an excessive voltage might be applied to the discharge lamp DL due to the resonance of the inductor L1 and the capacitor C3. It will be the cause of increasing the withstand voltage of the switching elements. Alternatively, it will be the cause of complexity of structure of the control circuit so as to prevent the increase of the withstand voltage of the elements.

DISCLOSURE OF INVENTION

A purpose of the present invention is to solve the above-mentioned problem and to provide a lighting apparatus of high intensity discharge lamp by which the increase of the stresses or upsizing of the elements can be prevented, and the transition from glow discharge to arc discharge after lighting the discharge lamp smoothly.

For accomplishing the above-mentioned purpose, a lighting apparatus of high intensity discharge lamp in accordance with an aspect of the present invention comprises a DC power source, a series connection of a first switch and a second switch, a series connection of a first capacitor and a second capacitor which is connected in parallel with the series connection of the first switch and the second switch, a series connection including at least an inductor and a high intensity discharge lamp connected between a connection point of the first switch and the second switch and another connection point of the first capacitor and the second capacitor, a third capacitor connected in parallel with the high intensity discharge lamp, and a control circuit for switching on and off of the first switch and the second switch so as to supply electric power to the discharge lamp. A voltage between both terminals of the first capacitor is selected to be different from that of the second capacitor.

By such a configuration, the output voltage from the DC power source can be divided uneven. Thus, it is possible to apply a voltage having a waveform that pulse height in positive or negative phase is higher than the pulse height of the other phase. Capacitances of the first and second capacitors can be selected in a manner so that voltage of the higher pulse height is made higher than the threshold value necessary for lighting of the discharge lamp. As a result, the discharge in the discharge lamp can smoothly transmit from glow discharge to arc discharge after starting up of the lighting without increasing the output voltage from the DC power source. Furthermore, since the output voltage from the DC power source is not increased than the conventional lighting apparatus, the increase of the stresses or upsizing of elements constituting the lighting apparatus can be prevented.

BEST MODE FOR CARRYING OUT THE INVENTION

First Embodiment

Figure 1:
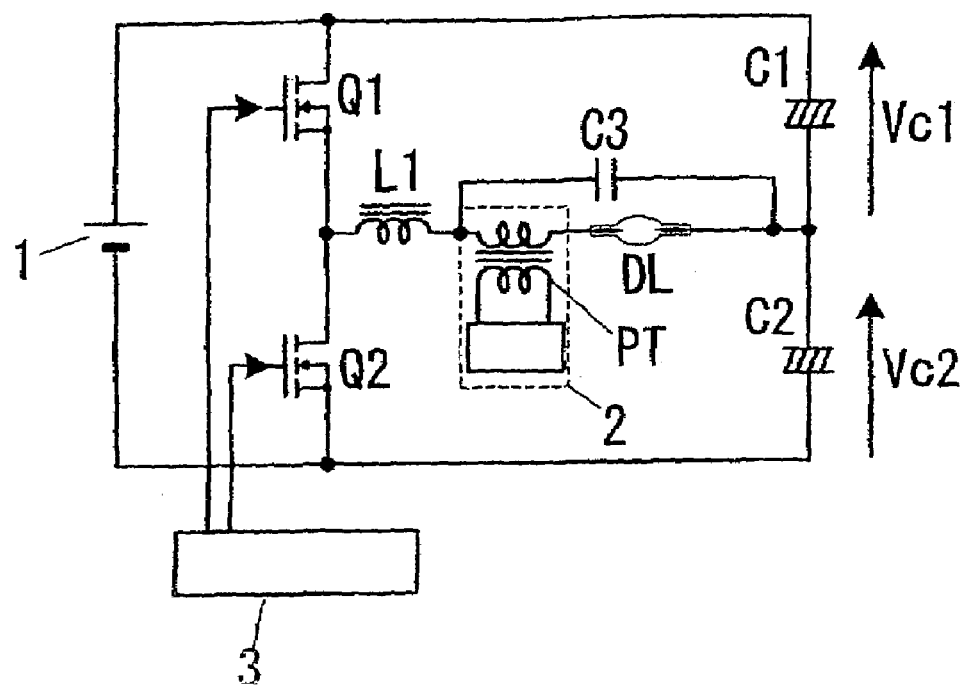
FIG. 1 is a circuit diagram of a lighting apparatus of high intensity discharge lamp in accordance with a first embodiment of the present invention.
Figure 2:
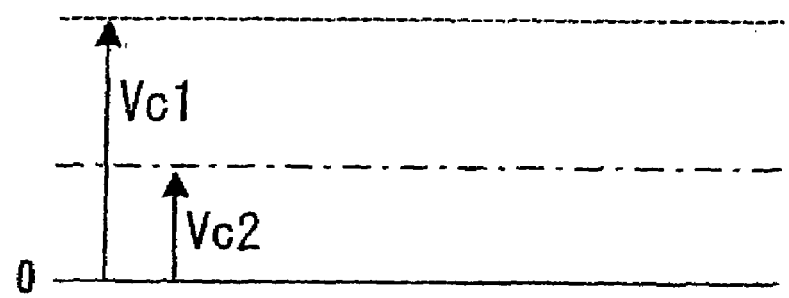
FIG. 2 is a graph showing voltages between terminals of smoothing capacitors used in a circuitry of the lighting apparatus ion the first embodiment.
Figure 3:
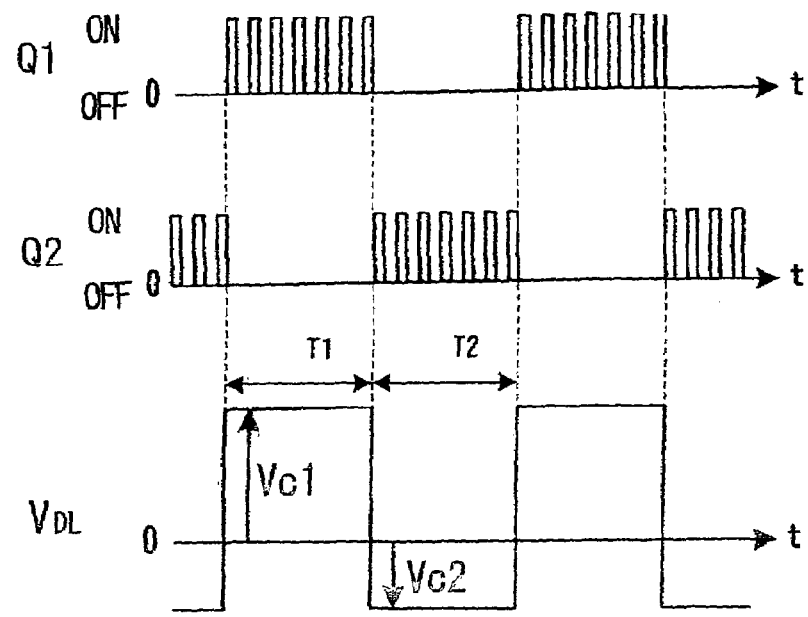
FIG. 3 is a timing chart showing motion of the lighting apparatus in the first embodiment.

A first embodiment of the present invention is described. FIG. 1 shows a configuration of a lighting apparatus of high intensity discharge lamp in accordance with the first embodiment. FIG. 2 shows a relation between voltages Vc1 and Vc2 of capacitors C1 and C2 used in the lighting apparatus. FIG. 3 shows timings of switching on and off of transistors Q1 and Q2 and a waveform of voltage $V_{DL}$ applied to a discharge lamp DL.

As shown in FIG. 1, the lighting apparatus in the first embodiment comprises a DC power source 1, a series connection of two transistors (for example, MOS-FET in the figure) Q1 and Q2, a series connection of two smoothing capacitors C1 and C2 which is connected in parallel with the series connection of the transistors Q1 and Q2. A series connection of an inductor L1, an ignitor 2 and a high intensity discharge lamp DL is further connected between a connection point of the transistors Q1 and Q2 and another connection point of the capacitors C1 and C2. A capacitor C3 is connected in parallel with a series connection of the ignitor 2 and the discharge lamp DL. The transistor Q1 serving as a first switch and the transistor Q2 serving as a second switch are switched on and off by a control circuit 3 so as to supply an electric power to the discharge lamp DL. The voltage of the electric power supplied to the discharge lamp DL has rectangular alternating waveform with a low frequency.

A capacitance of the capacitor C1 is selected to be different from that of the capacitor C2 so that a voltage Vc1 between both terminals of the capacitor C1 is different from a voltage Vc2 between both terminals of the capacitor C2. Specifically, the lowest voltage (threshold value) for lighting the discharge lamp DL is larger than about 250V to 300V. Thus, the largest absolute value that is the pulse height of the voltage of rectangular alternating voltage supplied to the discharge lamp DL is made larger than 300V. The capacitances of the capacitors C1 and C2 are selected in a manner so that the voltage Vc1 higher than the voltage Vc2 becomes equal to or larger than 300V.

For example, when a voltage of the DC power source 1 is 450V, and a ratio of the capacitances of the capacitors C1 and C2 is selected to be 1:2, the voltages Vc1 and Vc2 respectively become 300V and 150V, as shown in FIG. 2. The control circuit 3 controls the transistors Q1 and Q2 in a manner so that the transistors Q1 and Q2 are alternately driven in a low frequency, the transistor Q1 is frequently switched on and off with a high frequency in a term T1 while the transistor Q2 is switched off, and the transistor Q2 is frequently switched on and off with a high frequency in a term T2 while the transistor Q1 is switched off, as shown in FIG. 3. The absolute value of the voltage Vc1 which is applied to the discharge lamp DL in the term T1 becomes 300V, and the absolute value of the voltage Vc2 which is applied to the discharge lamp DL in the term T2 becomes 150V.

Since the capacitances of the capacitors C1 and C2 are selected to be different from each other, the voltages Vc1 and Vc2 of the capacitors C1 and C2 can optionally be selected to 300V and 150V by setting the ratio of the capacitances to 1:2. Thus, the value of the voltage applied to the discharge lamp DL can be increased without utilizing the resonance of the inductor and the capacitor, so that no-load voltage can easily be applied to the discharge lamp DL in start up of lighting. Since the output voltage from the DC power source 1 is not increased in comparison with the conventional lighting apparatus, it is possible to prevent the increase of the stresses or upsizing of the elements. Furthermore, since a relatively high no-load voltage of 300V can be applied to the discharge lamp DL while the discharge lamp DL has not been lighted, the transition from glow discharge to arc discharge after starting up the lighting of the discharge lamp DL can be made smoothly.

In the above-mentioned description of the first embodiment, the MOS-FETs are used as the transistors Q1 and Q2 serving as the first and second switches. It, however, is possible to use bipolar transistors and diodes connected to the bipolar transistor back to back as the first and second switches.

Second Embodiment

Figure 4:
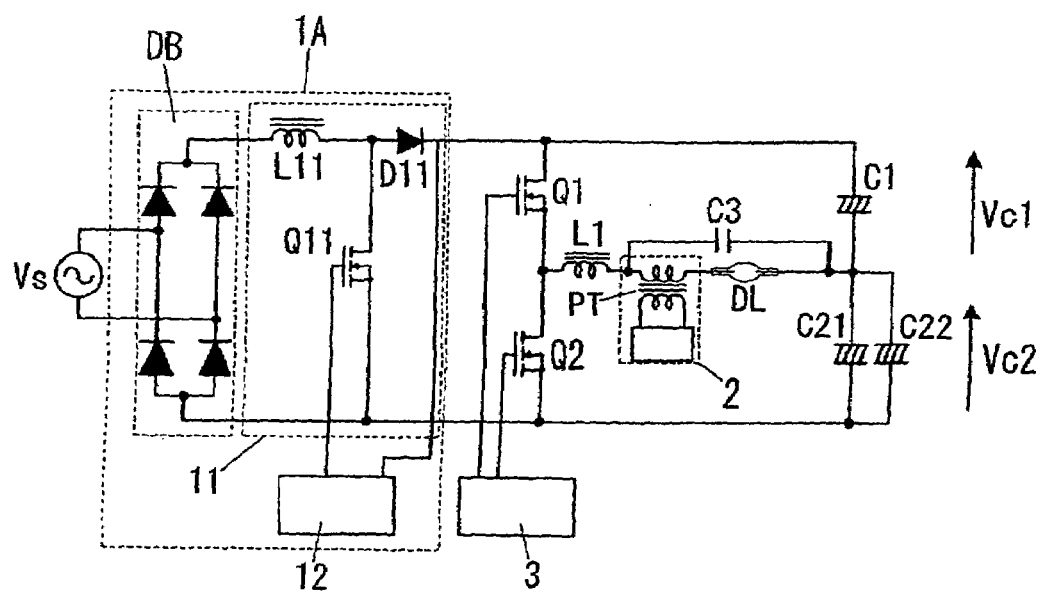
FIG. 4 is a circuit diagram of a lighting apparatus of high intensity discharge lamp in accordance with a second embodiment of the present invention.
Figure 5:
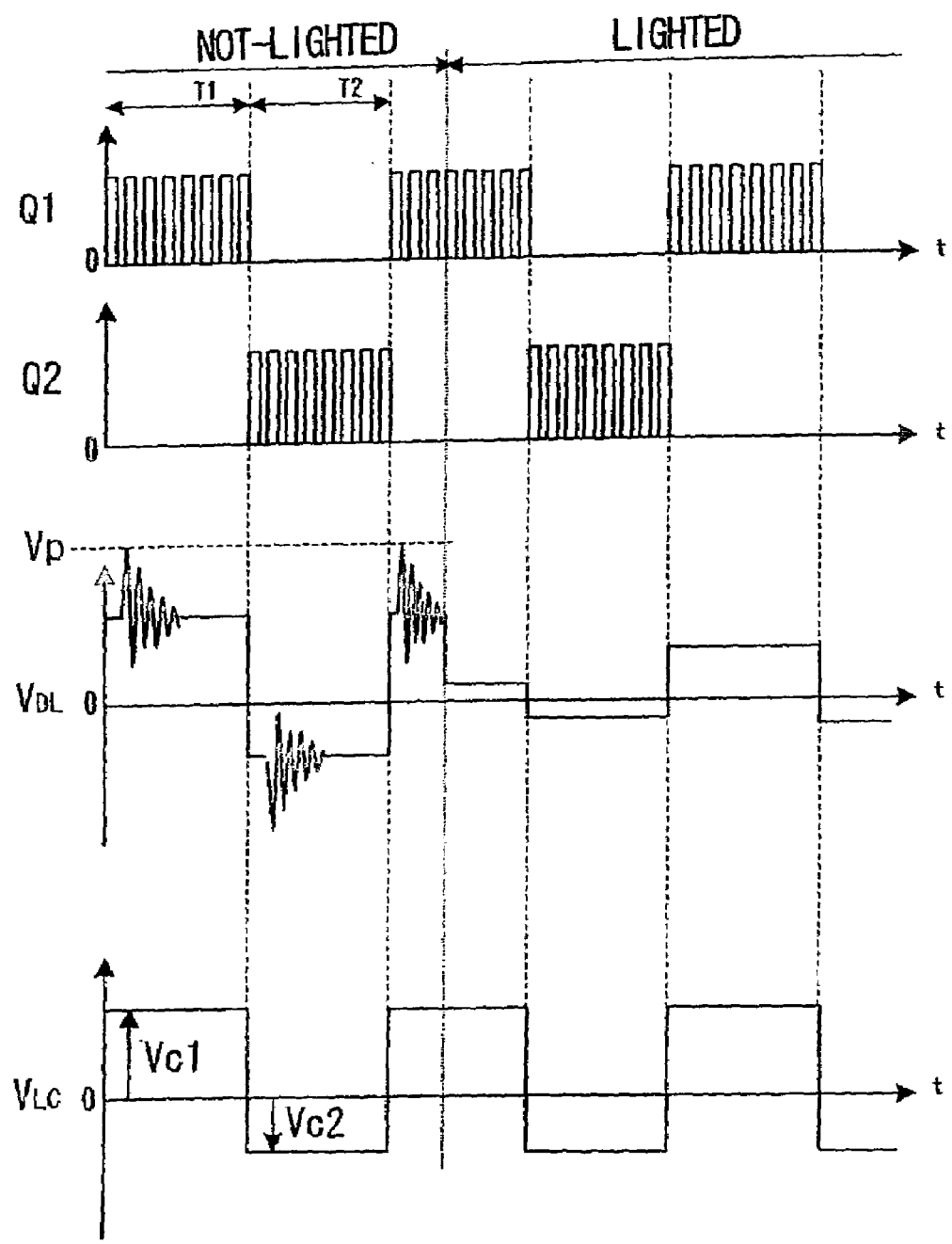
FIG. 5 is a timing chart showing motion of the lighting apparatus in the second embodiment.

A second embodiment of the present invention is described. FIG. 4 shows a configuration of a lighting apparatus of high intensity discharge lamp in accordance with the second embodiment. FIG. 5 shows timings of switching on and off of transistors Q1 and Q2 and waveforms of voltage $V_{DL}$ and $V_{LC}$ applied to a discharge lamp DL.

In comparison with FIGS. 1 and 4, the lighting apparatus in the second embodiment comprises a DC power supply 1A instead of the DC power source 1 and a parallel connection of capacitors C21 and C22 instead of the capacitor C2.

The DC power supply 1A comprises a diode bridge DB serving as a full-wave rectifier rectifying alternating voltage of commercial power source Vs to DC voltage, a boosting chopper 11 constituted by an inductor L11, a transistor (MOS-FET) Q11 and a diode D11, and a control circuit 12 sensing an output of the boosting chopper 11 and switching on and off the transistor Q11 so as to make the voltage of the output of the boosting chopper 11 be a predetermined value.

Capacitances of the capacitors C21 and C22 are substantially the same as that of the capacitor C1, so that a ratio of the capacitance of the capacitor C1 with respect to a total capacitance of the parallel connection of the capacitors C21 and C22 becomes 1:2. When the switching operations of the transistors Q1 and Q2 substantially the same as those in the above-mentioned first embodiment are executed by the control circuit 3, the voltage $V_{LC}$ between a connection point of the transistors Q1 and Q2 and another connection point of the capacitors C1 and the parallel connection of the capacitors C21 and C22 becomes 300V in the term T1, and the voltage $V_{LC}$ becomes 150V in the term T2.

As shown in FIG. 5, while the discharge lamp DL has not been lighted, high frequency and high voltage pulses $V_P$ of, for example, 3 to 5 kV are superimposed on the rectangular alternating voltage $V_{LC}$ having a low frequency, at least in the term T1 owing to the motion of the ignitor 2. In FIG. 5, the high frequency and high voltage pulses $V_P$ are superimposed on the rectangular alternating voltage $V_{LC}$ not only in the term T1 but also in the term T2. Since the voltage $V_{DL}$ in which the high frequency and high voltage pulses $V_P$ are superimposed on the rectangular alternating voltage component $V_{CL}$ is applied to the discharge lamp DL, so that the discharge lamp DL will be lighted. While the discharge lamp DL has been lighted, the rectangular alternating voltage component $V_{LC}$ is applied to the discharge lamp DL having different pulse heights in the terms T1 and T2.

As mentioned above, the series connection of the capacitors C21 and C22 having the same capacitance as that of the capacitor C1 is used instead of the capacitor C2 in the second embodiment, the same effect as that in the first embodiment can be achieved. Furthermore, it is possible to prevent miss-assemble of the capacitors C1, C21 and C22.

Furthermore, the switching operations of the transistors Q1 and Q2 while the discharge lamp DL has been lighted is substantially the same as those while the discharge lamp DL has not been lighted, so that the circuitry of the control circuit 3 can be made simple.

Figure 6:
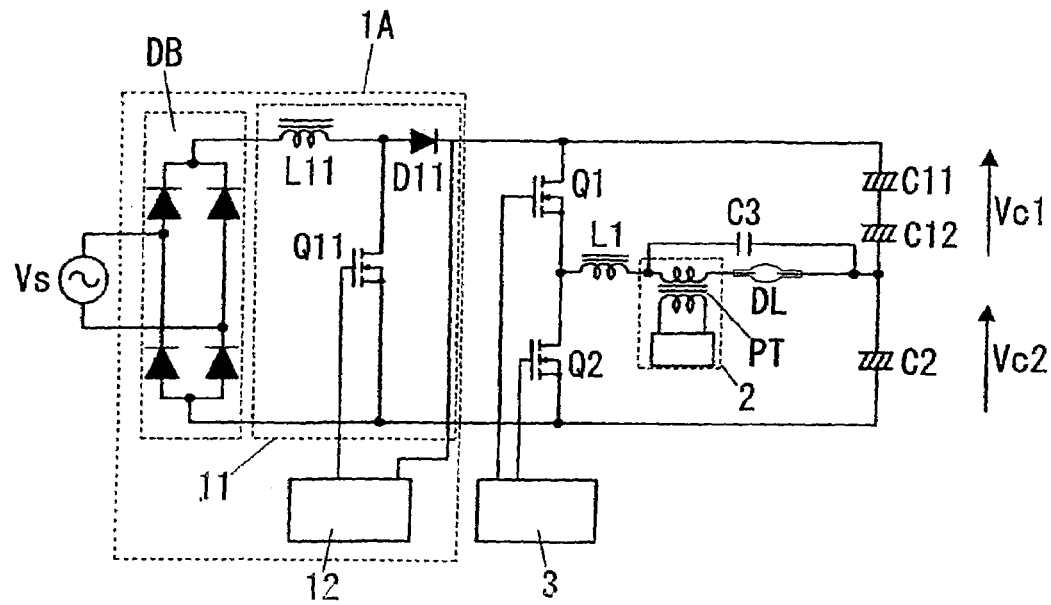
FIG. 6 is a circuit diagram of a modified lighting apparatus in the second embodiment.

A modification of the lighting apparatus in the second embodiment is shown in FIG. 6. As can be seen from FIG. 6, it is possible to replace the capacitor C1 with a series connection of capacitors C11 and C12 having the same capacitance as that of the capacitor C2. By such a configuration, a ratio of the total capacitance of the series connection of the capacitors C11 and C12 with respect to the capacitance of the capacitor C2 becomes 1:2, so that the same effects as those in the second embodiment can be achieved.

Third Embodiment

Figure 7:
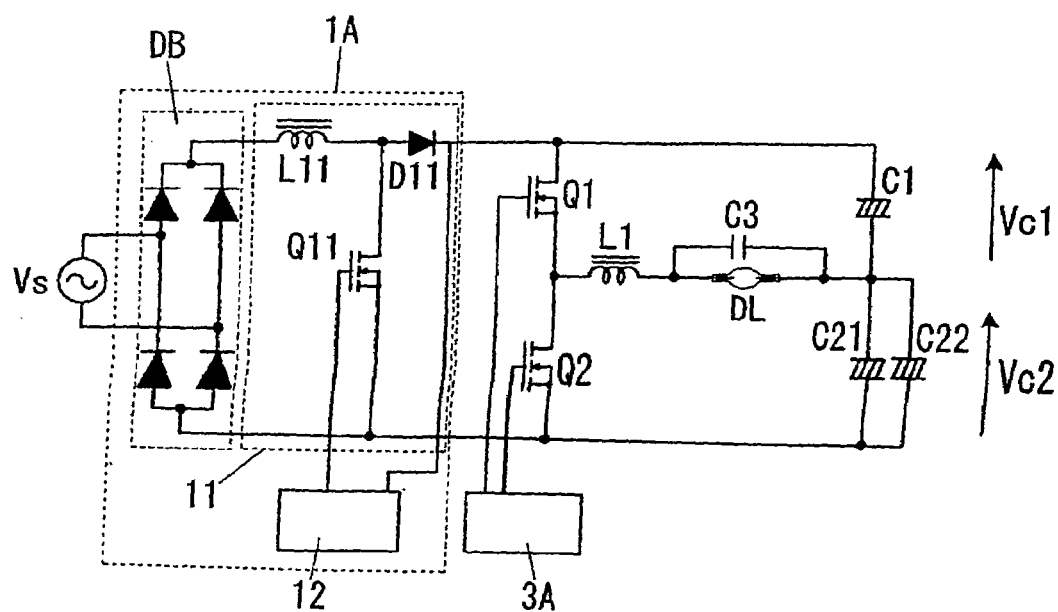
FIG. 7 is a circuit diagram of a lighting apparatus of high intensity discharge lamp in accordance with a third embodiment of the present invention.
Figure 8:
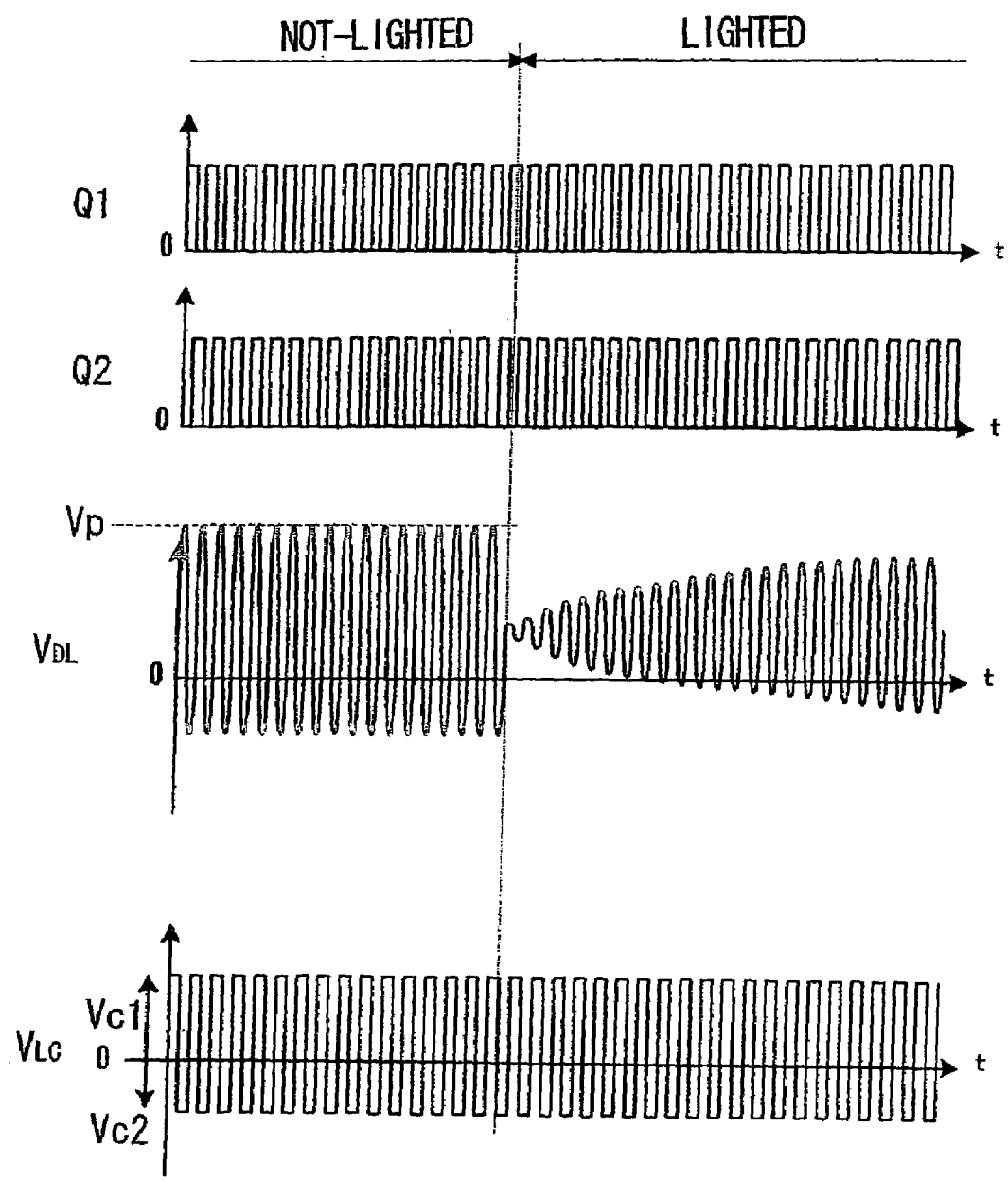
FIG. 8 is a timing chart showing motion of the lighting apparatus in the third embodiment.

A third embodiment of the present invention is described. FIG. 7 shows a configuration of a lighting apparatus of high intensity discharge lamp in accordance with the third embodiment. FIG. 8 shows timings of switching on and off of transistors Q1 and Q2 and waveforms of voltages $V_{DL}$ applied to a discharge lamp DL and $V_{LC}$ applied to an inductor L1 and a capacitor C3.

In comparison with FIGS. 4 and 7, the lighting apparatus in the third embodiment has no ignitor 2. A control circuit 3A utilizes resonance of the inductor L1 and the capacitor C3.

As shown in FIG. 8, the control circuit 3A executes switching operation for alternately switching on and off the transistors Q1 and Q2 in a high frequency. By such operation, an alternating voltage $V_{DL}$ having peak values $V_P$ in a range from about 3 kV to about 5 kV is applied to the terminals of the discharge lamp DL, so that the discharge lamp DL will start to light.

A rectangular alternating voltage $V_{LC}$ applied to the inductor L1 and the capacitor C3 has a relation Vc1>Vc2. In comparison with the conventional lighting apparatus in which the alternating voltage $V_{LC}$ has the relation Vc1=Vc2, it is possible to increase the voltage $V_{LC}$ so that the resonance of the inductor L1 and the capacitor C3 can be reduced and the withstand voltage of the elements constituting the circuit can be reduced.

Fourth Embodiment

Figure 9:
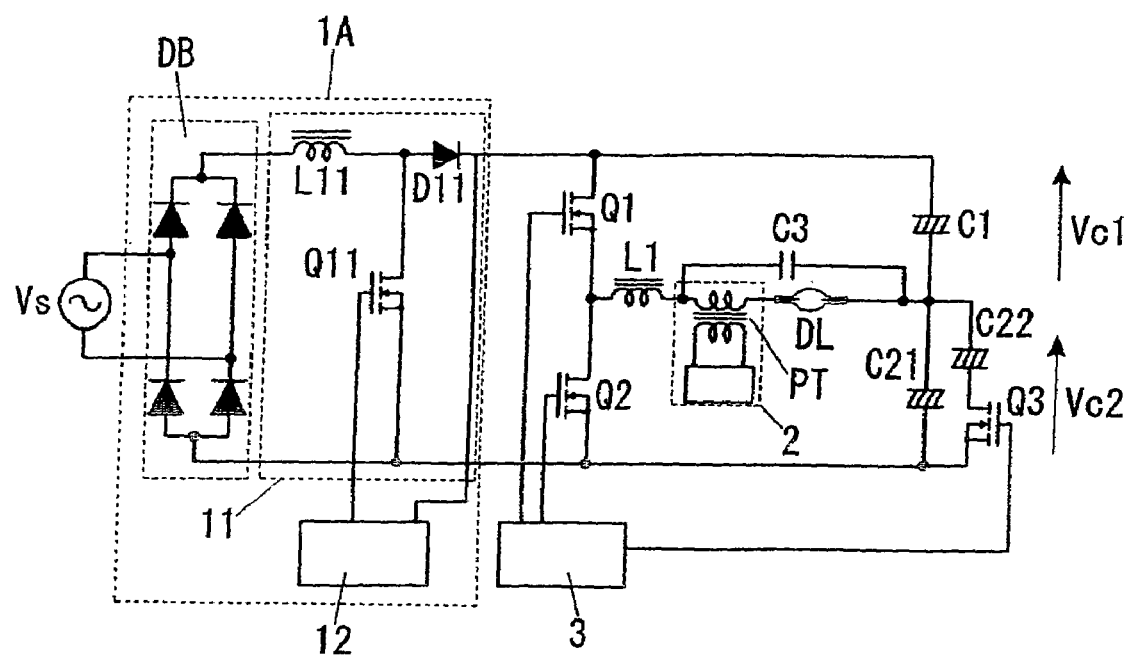
FIG. 9 is a circuit diagram of a lighting apparatus of high intensity discharge lamp in accordance with a fourth embodiment of the present invention.
Figure 10:
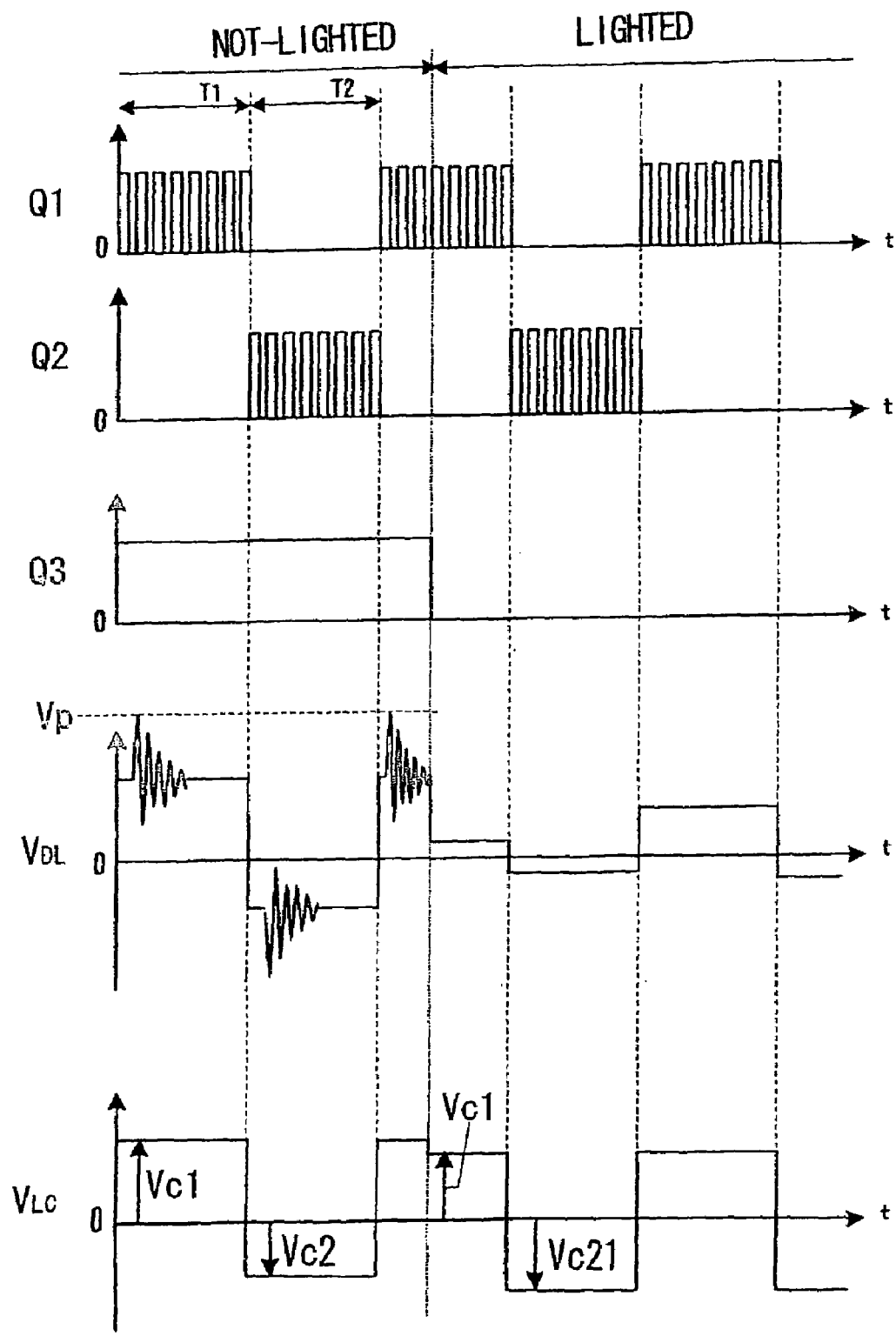
FIG. 10 is a timing chart showing motion of the lighting apparatus in the fourth embodiment.

A fourth embodiment of the present invention is described. FIG. 9 shows a configuration of a lighting apparatus of high intensity discharge lamp in accordance with the fourth embodiment. FIG. 10 shows timings of switching on and off of transistors Q1, Q2 and Q3 and waveforms of voltages $V_{DL}$ applied to a discharge lamp DL and $V_{LC}$ applied to an inductor L1 and a capacitor C3.

In comparison with FIGS. 4 and 9, the lighting apparatus in the fourth embodiment further has a transistor Q3 serially connected to the capacitor C22. The control circuit 3 switches on the transistor Q3 while the discharge lamp DL has not been lighted, and switches off the transistor Q3 while the discharge lamp DL has been lighted.

As shown in FIG. 10, since the transistor Q3 is switched on while the discharge lamp DL has not been lighted, the voltage $V_{LC}$ becomes a rectangular alternating voltage due to the voltage Vc1 between the terminals of the capacitor C1 and the voltage Vc2 between the terminals of the parallel connection of the capacitors C21 and C22. Thus, the motion of the lighting apparatus in the fourth embodiment becomes substantially the same as that in the second embodiment. On the other hand, since the transistor Q3 is switched off when the discharge lamp DL has been lighted, the voltage $V_{LC}$ becomes a rectangular alternating voltage due to the voltage Vc1 between the terminals of the capacitor C1 and the voltage Vc21 between the terminals of the capacitor C21. The pulse heights in the positive and negative phases of the voltage $V_{LC}$ become equal to each other.

By such a configuration, since the pulse heights in the positive and negative phases of the voltage $V_{LC}$ become equal, the circuitry of the control circuit 3 can be designed substantially the same as that of the conventional circuitry of the control circuit.

Fifth Embodiment

Figure 11:
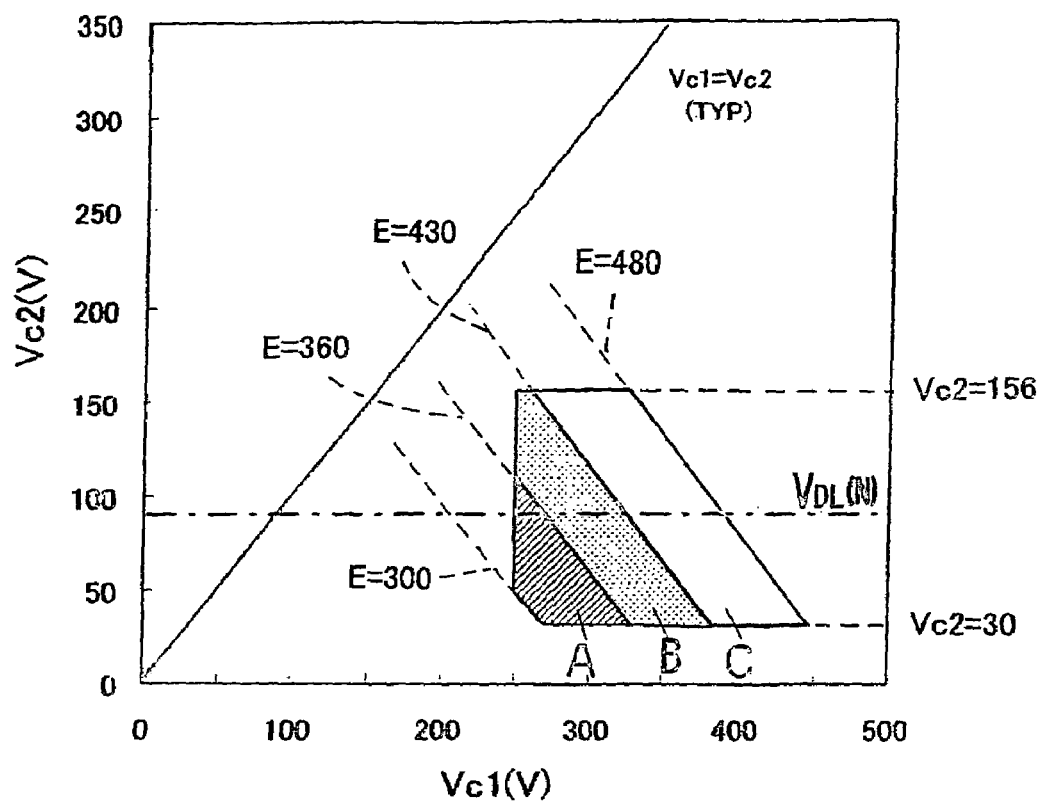
FIG. 11 is a graph showing design specification of a lighting apparatus of high intensity discharge lamp in accordance with a fifth embodiment of the present invention.

A fifth embodiment of the present invention is described. FIG. 11 shows a design specification of a lighting apparatus of high intensity discharge lamp in accordance with the fifth embodiment. The fifth embodiment relates to the design specification of the lighting apparatus. The lighting apparatus in the fifth embodiment has substantially the same circuitry as that in the second embodiment illustrated in FIG. 4.

In the boosting chopper 11 illustrated in FIG. 4, it is generally known that the output voltage E from the DC power supply should be higher than the largest value of the input AC voltage for improving waveform distortion of the input current. Hereupon, the largest value of the input AC voltage is designated by a symbol Vsmax, and the inductance of the inductor L11 is designated by a symbol $L_{11}$. The value of current $I_{on}$ flowing in a loop of the inductor L11 and the transistor Q11 when the transistor Q11 is switched on, the value $I_{on}$ is designated by the following equation (1).

$$I_{on} = V\text{smax}/L_{11} \cdot t_{on} \quad (1)$$

Similarly, the value of current $I_{off}$ flowing in a loop of the inductor L11, the diode D11 and the capacitors C1, C21 and C22 when the transistor Q11 is switched off, the value $I_{off}$ is designated by the following equation (2).

$$I_{off} = (E - V\text{smax})/L_{11} \cdot t_{off} \quad (2)$$

From the equation (2), when the output voltage E from the DC power supply 1A is larger than the largest value of the input AC voltage (E>Vsmax), the current $I_{off}$ can flow continuously. Thus, the waveform distortion of the input current can be reformed.

Table 1 shows the spec of the lighting apparatus corresponding to effective values of input voltages.

TABLE 1

| INPUT VOLTAGE (V) (EFFECTIVE VALUE) | E (V) = Vc1 + Vc2 | Vc1 (V) | Vc2 (V) | VOLTAGE RATIO (Vc1/Vc2) |
|---|---|---|---|---|
| 100 | 300–480 | 250–450 | 30–156 | 1.6–15 |
| 200 | 360–480 | | | |
| 277 | 430–480 | | | |

The table 1 shows that the voltage E outputted from the DC power supply 1A should be designed in a range from 360V to 480V, when the effective value of the commercial AC power source Vs is, for example 200V. Details of the table 1 are specifically described.

The largest value Vsmax of the input AC voltage is calculated by the following equation (3) with regard to the variation of the commercial AC power source Vs about 10%.

$$\sqrt{2} \times 200 \times 1.1 \approx 310(V) \quad (3)$$

As mentioned above, it is necessary that the output voltage from the DC power supply 1A is larger than the largest value of the input AC voltage. Hereupon, the larger the output voltage from the DC power supply 1A, the smoother the waveform distortion of the input current is reformed. When the output voltage from the DC power supply 1A, however, is too high, the withstand voltage of the elements constituting the DC power supply 1A becomes much higher corresponding to the increase of the output voltage from the DC power supply 1A. It will cause the increase of stress burdening the elements and the upsizing of the elements. Thus, it is preferable to have a tolerance about 50V to be added to the largest value Vsmax of the input AC voltage. Thus, the lower limit of the voltage of the DC power supply 1A should be equal to or higher than 360V (=310V+50V).

The upper limit of the voltage of the DC power supply 1A is defined corresponding to multiplicity of voltage values of the DC power supply 1A. The circuitry of the DC power supply 1A such as the boosting chopper 11 is configured commonly with no relation to the effective value 100V, 200V or 277V of the AC power source. When the above-mentioned calculation is executed with respect to the effective value 277V of the AC power source, the largest value Vsmax of input AC voltage is calculated by the following equation (4).

$$\sqrt{2} \times 277 \times 1.1 \approx 430(V) \quad (4)$$

By adding the tolerance about 50V, the upper limit of the voltage of the DC power supply 1A should be equal to or higher than 480V (=430V+50V).

When the same calculations are executed with respect to the effective value 100V of the AC power source, the lower limit of the voltage of the DC power supply 1A becomes 205V. The no-load voltage of the discharge lamp DL, however, is 250V to 300V, so that the lower limit of the voltage of the DC power supply 1A with respect to the effective value 100V should be 300V.

In the lighting apparatus illustrated in FIG. 4, the voltage $V_{DL}$ applied to the discharge lamp DL becomes equal to the voltage Vc1 of the capacitor C1 or the voltage Vc2 of the parallel connection of the capacitors C21 and C22. Since the lower limit of the no-load voltage applied to the discharge lamp DL while the discharge lamp DL has not been lighted is larger than about 250V to 300V, it is necessary to make the voltage Vc1 of the capacitor C1 be larger than 250V. Thus, the lower limit of the voltage Vc1 is selected to be 250V. Hereupon, the largest value of the withstand voltage of the multipurpose electrolytic capacitor is 450V. Thus, the upper limit of the voltage Vc1 is selected to be 450V.

The lower limit of the voltage Vc2 can be calculated by subtracting the value of the upper limit of the voltage Vc1 from the value of the upper limit of the output voltage E from the DC power supply 1A. Thus, the lower limit of the voltage Vc2 is selected to be 30V (=480V−450V). Similarly, the upper limit of the voltage Vc2 can be calculated by subtracting the value of the lower limit of the voltage Vc1 from the value of the upper limit of the output voltage E from the DC power supply 1A. Hereupon, the tolerance of the values of capacitances of the capacitors is made allowance with about 20%. Thus, the upper limit of the voltage Vc2 is selected to be 156V (=(480V−250V)×120%).

An upper limit and a lower limit of voltage ratio can be obtained by calculating the largest value and the smallest value of Vc1/Vc2. The lower limit of the voltage ratio becomes 1.6 (=250V/156V). The upper limit if the voltage ratio becomes 15 (=450V/30V).

FIG. 11 shows the areas of the voltages Vc1 and Vc2 obtained in the table 1. In FIG. 11, the abscissa designates the value of the voltage Vc1 and the ordinate designates the value of the voltage Vc2. A unionized area of areas designated by symbols A, B and C corresponds to the area suitable for the effective value 100V of the input AC voltage. A unionized area of the areas designated by the symbols A and B corresponds to the area suitable for the effective value 200V of the input AC voltage. The area designated by the symbol C corresponds to the area suitable for the effective value 277V of the input AC voltage.

When the value of the voltage Vc2 is too small, the discharge lamp DL could be extinguished while the discharge lamp DL has been lighted in rated voltage. Thus, it is preferable to select the spec of the lighting apparatus is further selected in the area above the rated voltage $V_{DL}(N)$ illustrated by one dotted chain line in FIG. 11.

As mentioned above, it is preferable to select the voltage ratio (Vc1/Vc2) in the range from 1.6 to 15 so that the waveform distortion of the input current can be reformed when the effective value of the input AC voltage is in a region from 100V to 277V. Thus, the no-load voltage necessary for lighting the discharge lamp DL can be applied.

Sixth Embodiment

Figure 12:
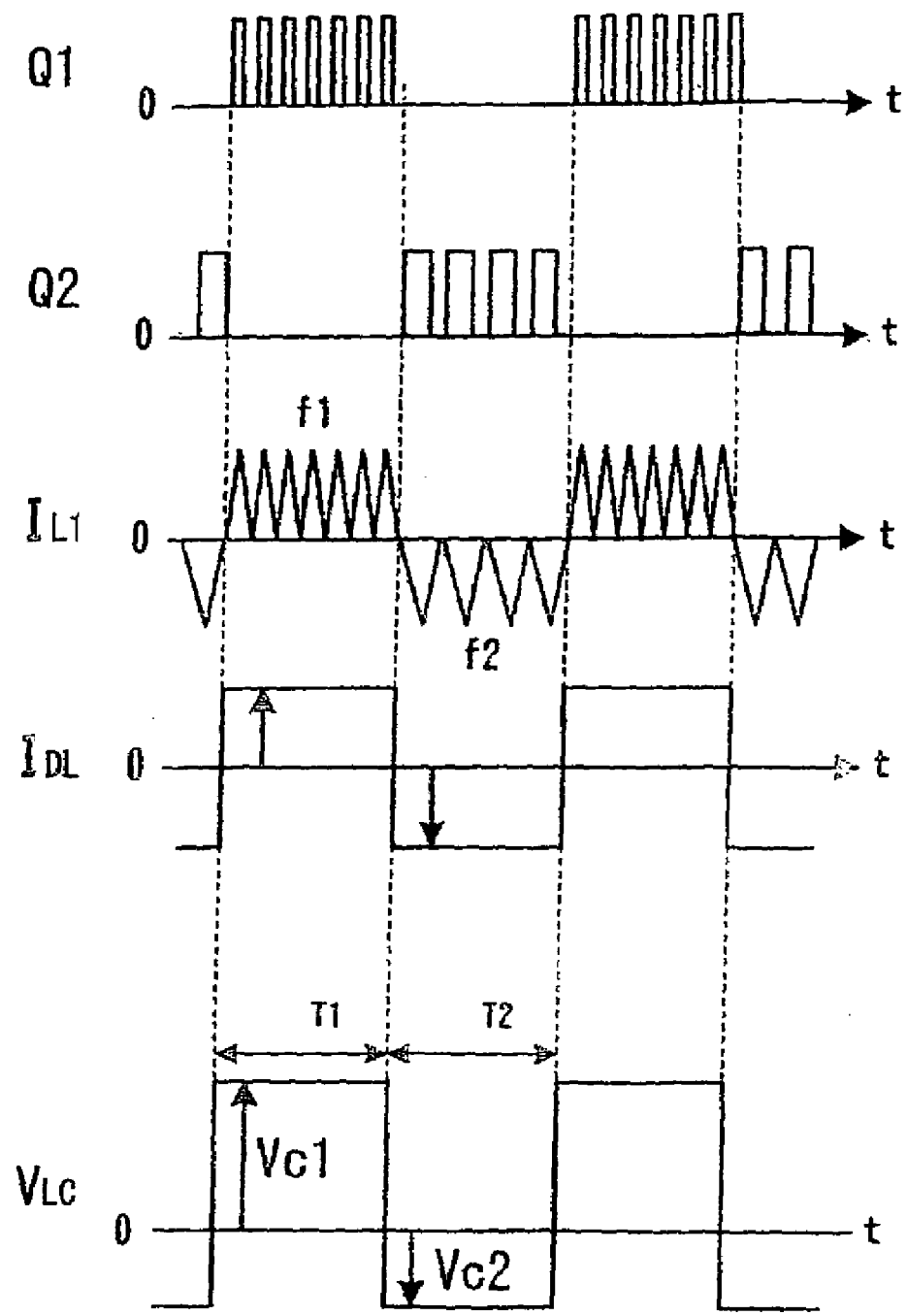
FIG. 12 is a timing chart showing motion of a lighting apparatus of high intensity discharge lamp in accordance with a sixth embodiment of the present invention.

A sixth embodiment of the present invention is described. FIG. 12 shows timings of switching on and off of transistors Q1 and Q23, waveforms of currents $I_{L1}$ flowing in an inductor L1 and $I_{DL}$ flowing in a discharge lamp DL, and a waveform of a voltage $V_{LC}$ applied to an inductor L1 and a capacitor C3 in a lighting apparatus of high intensity discharge lamp in accordance with the sixth embodiment. The lighting apparatus in the sixth embodiment has substantially the same circuitry as that in the second embodiment illustrated in FIG. 4.

As shown in FIG. 12, a switching frequency f1 for switching on and off the transistor Q1 is higher than a switching frequency f2 for switching on and off the transistor Q2.

The voltage Vc1 in the alternating voltage $V_{LC}$ is defined by the voltage between the terminals of the capacitor C1 and the voltage Vc2 is defined by the voltage between the terminals of the parallel connection of the capacitors C21 and C22. The pulse height Vc1 of the voltage $V_{LC}$ in the term T1 is higher than the pulse height Vc2 in the term T2. The switching frequency f2 of the transistor Q2 switching on and off in the term T2, however, is lower than the switching frequency f1 of the transistor Q1 switching on and off in the term T1. Thus, the absolute value of the current $I_{L1}$ flowing in the inductor L1 in the term T2 becomes larger since the frequency f2 reaches to the resonance frequency of the inductor L1 and the capacitor C3. In FIG. 12, the pulse height of the current $I_{L1}$ in the term T2 is illustrated substantially the same as that in the term T1. Wave forms of the current $I_{DL}$ flowing in the discharge lamp DL in the positive phase become substantially the same as those in the negative phase, owing to a filter constituted by reactance component of the ignitor 2 and the capacitor C3. That is, the pulse height of the current $I_{DL}$ in the term T1 becomes substantially the same as that in the term T2.

By setting the switching frequency of the transistor Q1 in the term T1 is larger than the switching frequency f2 of the transistor Q2 in the term T2, the pulse height of the current $I_{DL}$ in the term T1 can be made substantially the same as that in the term T2. Thus, it is possible to prevent the occurrence of stress at unilateral terminal of the discharge lamp DL, and it is advantageous to extend the life of the discharge lamp DL.

Seventh Embodiment

Figure 13:
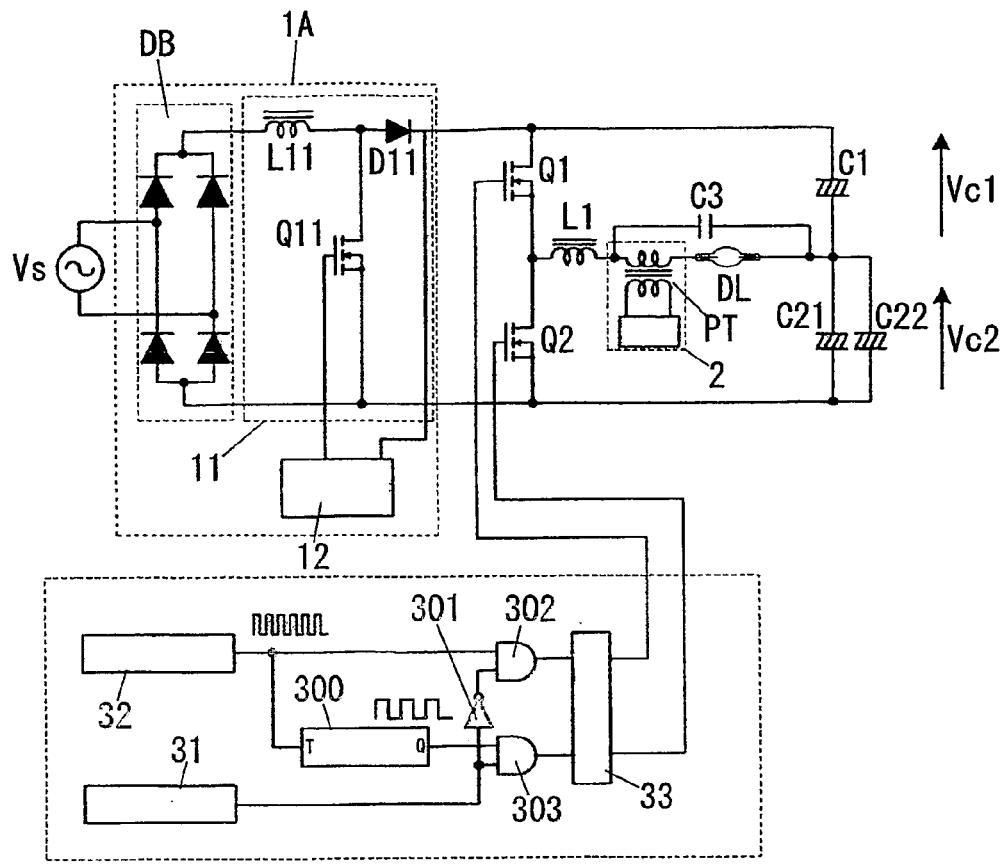
FIG. 13 is a circuit diagram of a lighting apparatus of high intensity discharge lamp in accordance with a seventh embodiment of the present invention.
Figure 14:
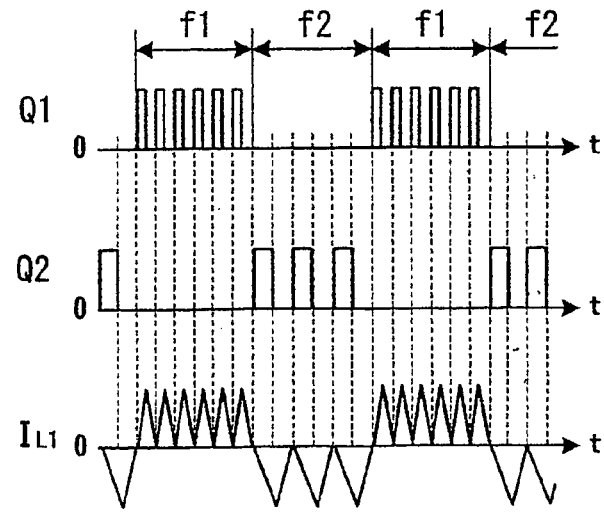
FIG. 14 is a timing chart showing motion of the lighting apparatus in the seventh embodiment.

A seventh embodiment of the present invention is described. FIG. 13 shows a configuration of a lighting apparatus of high intensity discharge lamp in accordance with the seventh embodiment. FIG. 14 shows timings of switching on and off of transistors Q1 and Q2 and waveform of current $I_{L1}$ flowing in an inductor L1.

In comparison with the above-mentioned sixth embodiment, the switching frequency f1 of the transistor Q1 in the term T1 is integral multiple of the switching frequency f2 of the transistor Q2 in the term T2 in the seventh embodiment.

By such selection of the switching frequencies f1 and f2, the control circuit 3 can be simplified, as shown in FIG. 13. The control circuit 3 comprises a low frequency oscillator 31, a high frequency oscillator 32, a toggle flip-flop 300, a NOT logic circuit 301, two AND logic circuits 302 and 303, and a driving circuit 33. Output of the high frequency oscillator 32 is connected to an input terminal T of the toggle flip-flop 300 and an input terminal of the AND logic circuit 302. An output terminal Q of the toggle flip-flop 300 is connected to an input terminal of the AND logic circuit 303. Output of the low frequency oscillator 31 is connected to the other input terminal of the AND logic circuit 303 and the other input terminal of the AND logic circuit 302 via the NOT logic circuit 301. Outputs of both AND logic circuit 302 and 303 are respectively connected to control terminals (gates) of the transistors Q1 and Q2.

In the control circuit 3, when the high frequency oscillator 32 generates a signal having a frequency f1, another signal having a frequency f2 which is a half of the frequency f1 occurs in the output of the toggle flip-flop 300. Subsequently, when the low frequency oscillator 31 generates a signal having a frequency of several hundreds Hz, the transistors Q1 and Q2 are alternately switched on and off in the low frequency of several hundreds Hz, and the transistor Q1 is frequently switched on and off in the high frequency f1 while the transistor Q2 is switched off, and the transistor Q2 is frequently switched on and off in a high frequency f2 while the transistor Q1 is switched off, as shown in FIG. 14. It is possible to execute the power control of the discharge lamp DL by adding a circuit to the control circuit 3 for converting a duty ratio of the transistors Q1 and Q2.

As mentioned above, when the switching frequency f1 of the transistor Q1 is selected to be the integral multiple of the switching frequency f2 of the transistor Q2, it is possible to generate the switching frequencies f1 and f2 by the same high frequency oscillator. Thus, the control circuit 3 can be configured by simple circuits.

It is possible to modify the lighting apparatus in the seventh embodiment to have substantially the same circuitry as that illustrated in FIG. 1. In such the modification, it is possible to switch on and off of the transistors Q1 and Q2 in the frequencies f1 and f2 where f1=n×f2 (n is a positive integer) by selecting the capacitances of the capacitors C1 and C2 be preferable values. The discharge lamp DL has been lighted in a BCM (Boundary Current Mode) in negative positive phases of the voltage $V_{DL}$ applied to the discharge lamp DL. In the BCM, current continuously flows in the discharge lamp DL, but the discharge lamp starts to light when the current value becomes 0.

Eighth Embodiment

Figure 15:
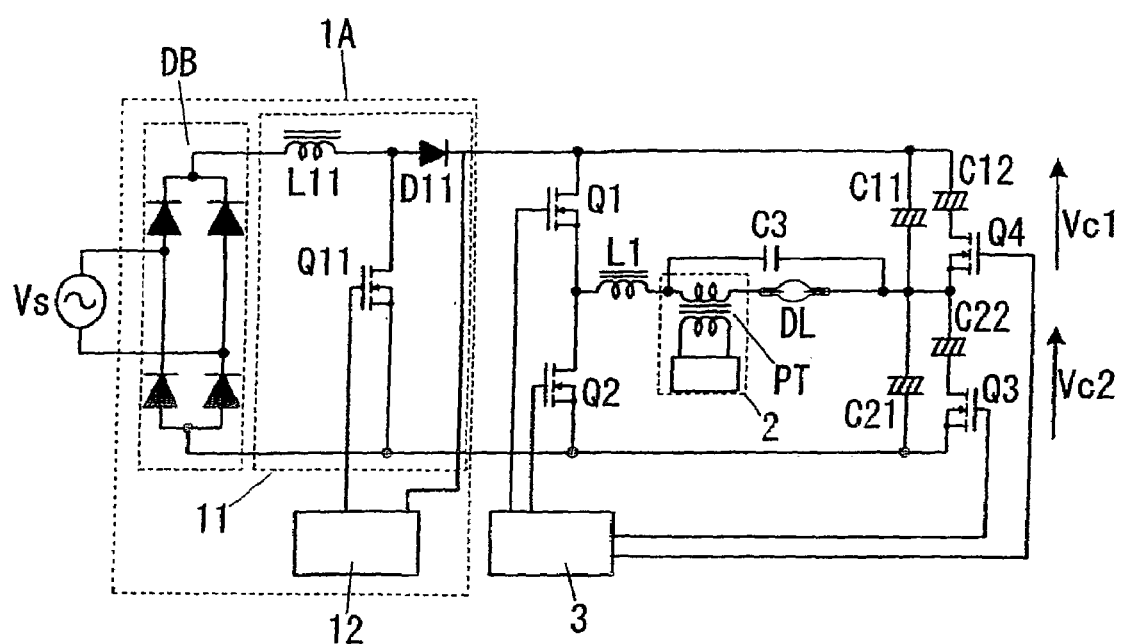
FIG. 15 is a circuit diagram of a lighting apparatus of high intensity discharge lamp in accordance with an eighth embodiment of the present invention.
Figure 16:
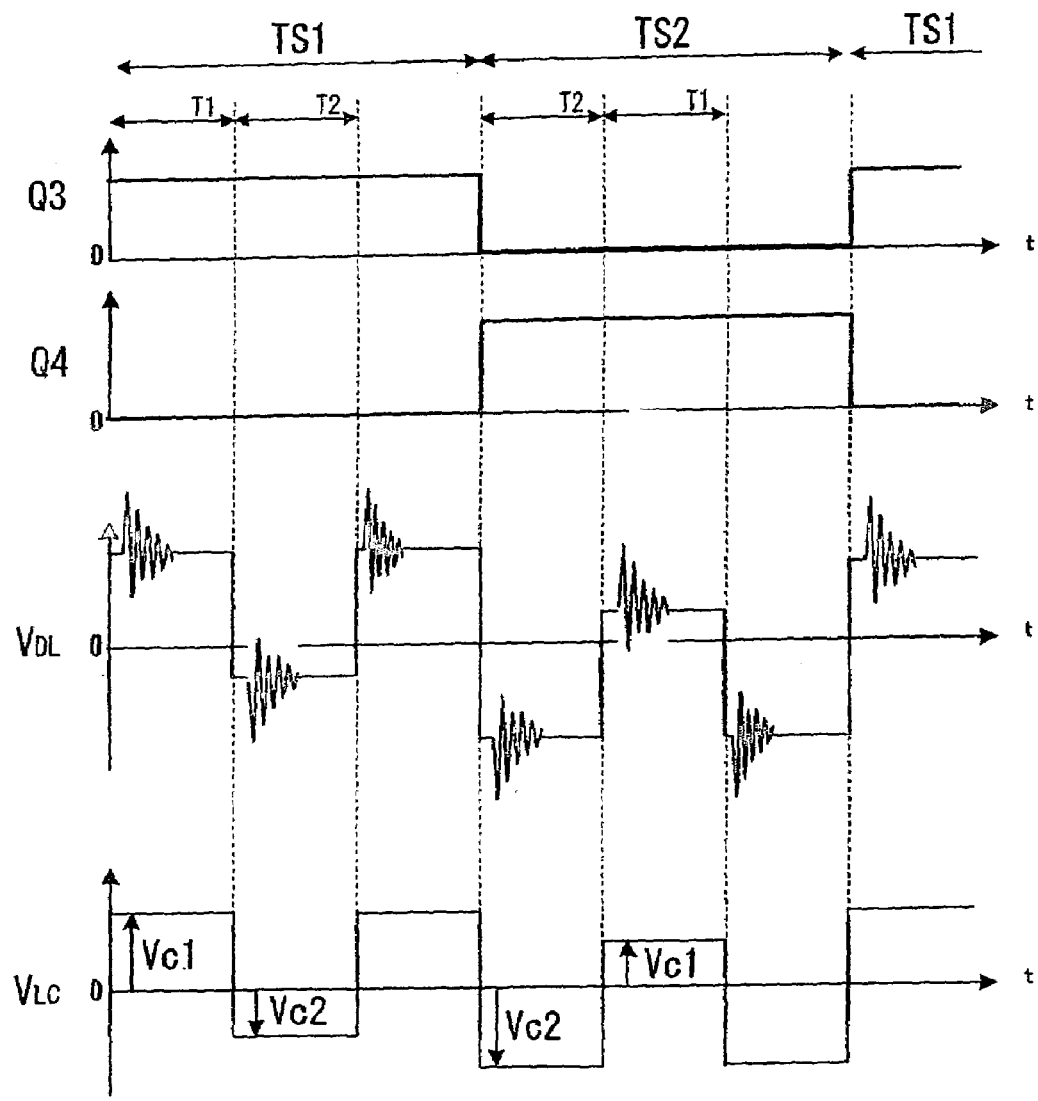
FIG. 16 is a timing chart showing motion of the lighting apparatus in the eighth embodiment.

An eighth embodiment of the present invention is described. FIG. 15 shows a configuration of a lighting apparatus of high intensity discharge lamp in accordance with the eighth embodiment. FIG. 16 shows timings of switching on and off of transistors Q3 and Q4, and waveforms of voltages $V_{DL}$ and $V_{LC}$.

In comparison with FIGS. 9 and 15, the lighting apparatus in the eighth embodiment has a parallel connection of a capacitor C11 and a series connection of a capacitor C12 and a transistor (MOS-FET) Q4 instead of the capacitor C1. The transistors Q3 and Q4 are alternately switched on and off by the control circuit 3 while the discharge lamp DL has not been lighted. Capacitances of the capacitors C11, C12, C21 and C22 are selected to be, for example, the same value.

As can be seen from FIG. 16, the transistor Q3 is switched on and the transistor Q4 is switched off in a term TS1. The transistor Q3 is switched off and the transistor Q4 is switched on in a term TS2 having the same time period as the term TS1.

In the term TS1, the capacitors C11, C21 and C22 are connected, so that the voltage Vc1 becomes larger than the voltage Vc2. Thus, the motion of the lighting apparatus becomes substantially the same as that in the second embodiment. On the contrary, in the term TS2, the capacitors C11, C12 and C21 are connected, so that the voltage Vc1 becomes smaller than the voltage Vc2. Thus, the voltage having a wave form that the pulse height Vc2 of the voltage $V_{LC}$ in the negative phase is higher than the pulse height Vc1 in the positive phase in the term TS2 is applied to the discharge lamp DL, as shown in FIG. 16. The pulse height Vc1 of the voltage $V_{LC}$ in the term T1 of the term TS1 becomes the same as the pulse height Vc2 in the term T2 of the term TS2, and the pulse height Vc2 in the term T2 of the term TS1 becomes the same as the pulse height Vc1 in the term T1 of the term TS2.

As mentioned above, the ratio of the total capacitance of the capacitors C11 and C12 with respect to the total capacitance of the capacitances C21 and C22 is alternately varied in the terms TS1 and TS2, so that the stresses applied to the terminals of the discharge lamp DL become substantially even. It is advantageous with respect to the life of the discharge lamp DL.

The switching timing between the mode of Vc1>Vc2 and the mode of VC1<Vc2 is not restricted by the above-mentioned terms TS1 and TS2. For example, a number of lighting of the discharge lamp DL is memorized. It is possible to switch the mode of Vc1>Vc2 to the other mode of Vc1<Vc2 when the number of lighting is an even number, and the mode of Vc1<Vc2 is switched to the other mode of Vc1>Vc2 when the number of lighting is an odd number, and vice versa.

Ninth Embodiment

Figure 17:
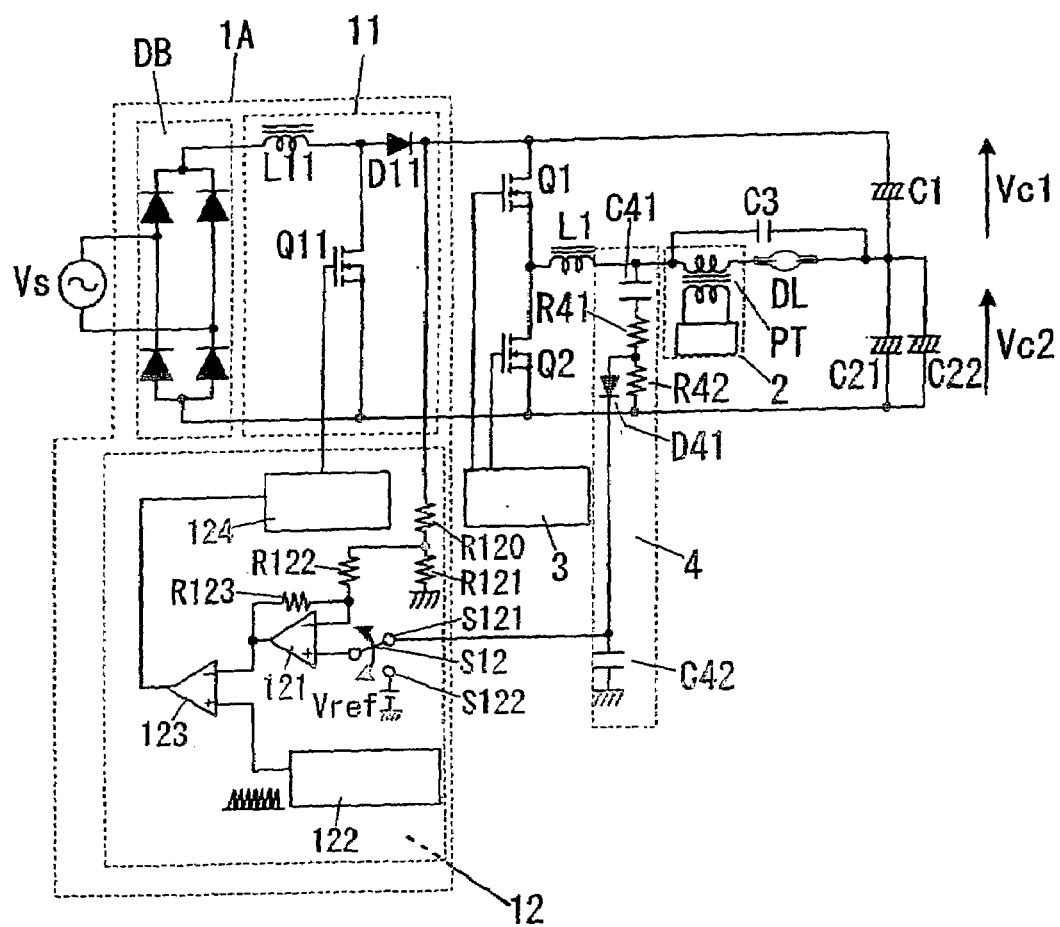
FIG. 17 is a circuit diagram of a lighting apparatus of high intensity discharge lamp in accordance with a ninth embodiment of the present invention.
Figure 18:
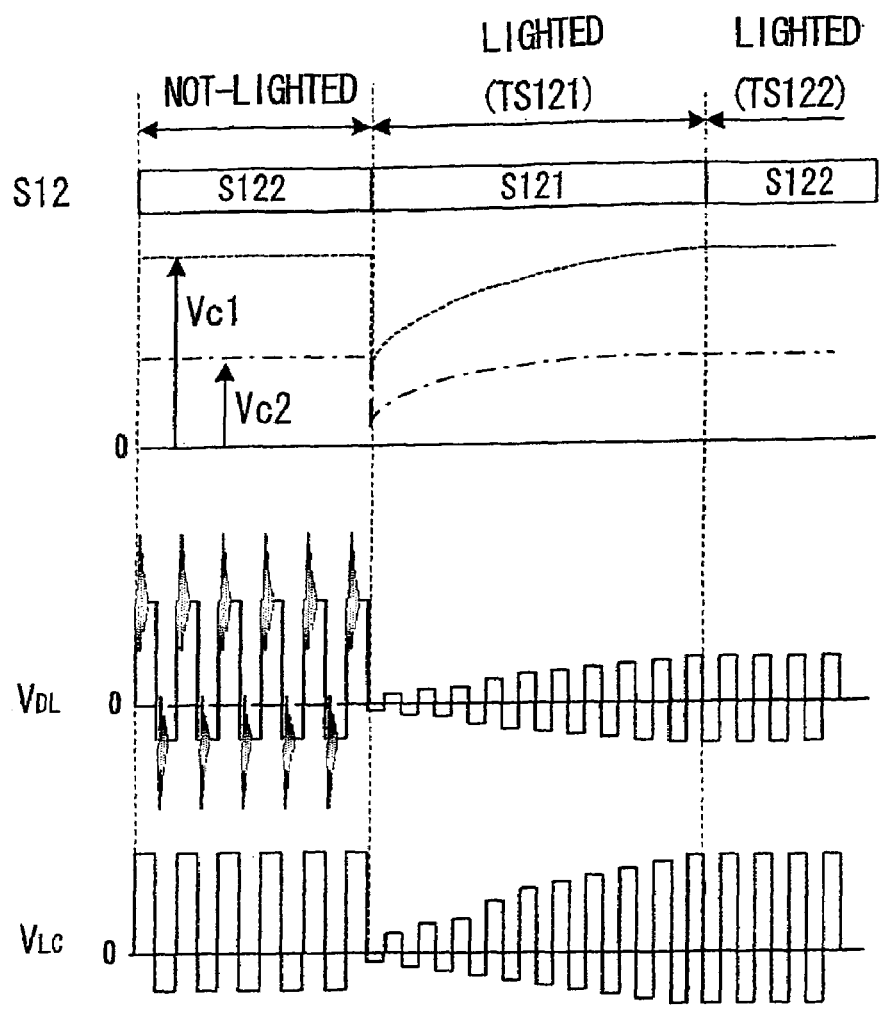
FIG. 18 is a timing chart showing motion of the lighting apparatus in the ninth embodiment.

A ninth embodiment of the present invention is described. FIG. 17 shows a configuration of a lighting apparatus of high intensity discharge lamp in accordance with the ninth embodiment. FIG. 18 shows timings of switching on and off of a switch S12, and waveforms of voltages $V_{DL}$ and $V_{LC}$.

In comparison with FIGS. 4 and 17, the lighting apparatus in the ninth embodiment further comprises a voltage sensing circuit 4 for sensing the voltage applied to the discharge lamp DL. The control circuit 12 is configured to switch the output of the DC power supply 1A corresponding to the voltage sensed by the voltage sensing circuit 4.

In the voltage sensing circuit 4, a series connection of a capacitor C41 and two resistors R41 and R42 is connected between the connection point of the inductor L1 and the capacitor C3 and the ground. A series connection of a diode D41 and a capacitor C42 is further connected in parallel with the resistor R42. A voltage generated in the capacitor C42 is taken into the control circuit 12 as a sensed voltage.

In the control circuit 12, an output voltage (Vc1+Vc2) from the DC power supply 1A is inputted to a negative input terminal of an operational amplifier 121 through a resistor R122, which is a divisional voltage of resistors R120 and R121. A resistor R123 is connected between the negative input terminal and an output terminal of the operational amplifier 121, so that error component of the voltage of output from the DC power supply 1A is amplified with a gain R123/R122 of the values of the resistors R122 and R123. Alternative of a reference voltage Vref and the sensed voltage is inputted to a positive input terminal of the operational amplifier 121 through the switch S12. An output signal from a high frequency oscillator 122 is inputted to a positive input terminal of a comparator 123. The output terminal of the operational amplifier 121 is connected to a negative input terminal of the comparator 123, so that a value of the input voltage to the negative input terminal of the comparator 123 is compared with a pulse height of a high frequency waveform of the output signal from the high frequency oscillator 122. A driving circuit 124 switched on and off the transistor Q11 corresponding to the result of comparison.

As can be seen from FIG. 18, the switch S12 is turned to a contact S122 while the discharge lamp DL has not been lighted, so that the voltages Vc1 and Vc2 are set to be, for example, 300V and 150V. In such term, high frequency and high voltage pulses are generated by the ignitor 2, so that the voltage $V_{DL}$ has waveforms that the high frequency and high voltage pulses are superimposed on low frequency rectangular alternating voltage component $V_{LC}$.

Subsequently, when the discharge lamp DL starts to light, the switch S12 is turned to a contact S121 corresponding to a judgment of a lighting discriminating circuit (not shown in the figure), so that the input to the positive input terminal of the operational amplifier 121 is switched to a value corresponding to the voltage between the terminals of the discharge lamp DL. Since the voltage between the terminals of the discharge lamp DL at the start of lighting is very small and gradually increases, the voltages Vc1 and Vc2 are gradually increased corresponding to the increase of the sensed voltage.

When the discharge lamp DL has been lighted in rated voltage, the switch S12 is turned to the terminal S122 again, and the voltages Vc1 and Vc2 are respectively switched to 300V and 150V.

By the above-mentioned controls, the value of DC voltages applied to the discharge lamp DL in the term TS121 just after the discharge lamp DL has been lighted can be reduces as smaller as possible at which the discharge lamp DL may not be extinct. Thus, efficiency of the boosting chopper 11 while the discharge lamp has been lighted can be increased.

Tenth Embodiment

Figure 19:
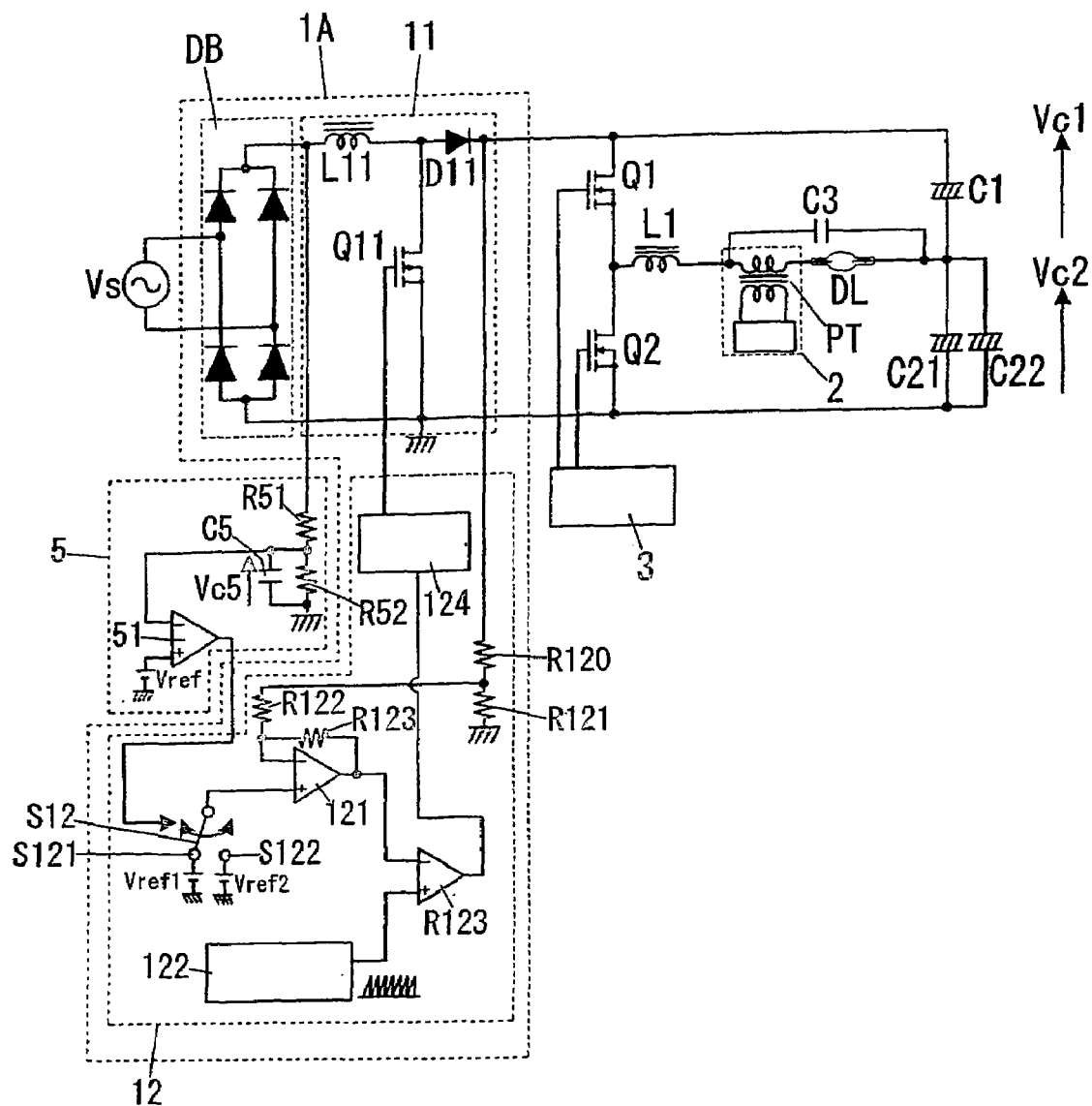
FIG. 19 is a circuit diagram of a lighting apparatus of high intensity discharge lamp in accordance with a tenth embodiment of the present invention.
Figure 20A:
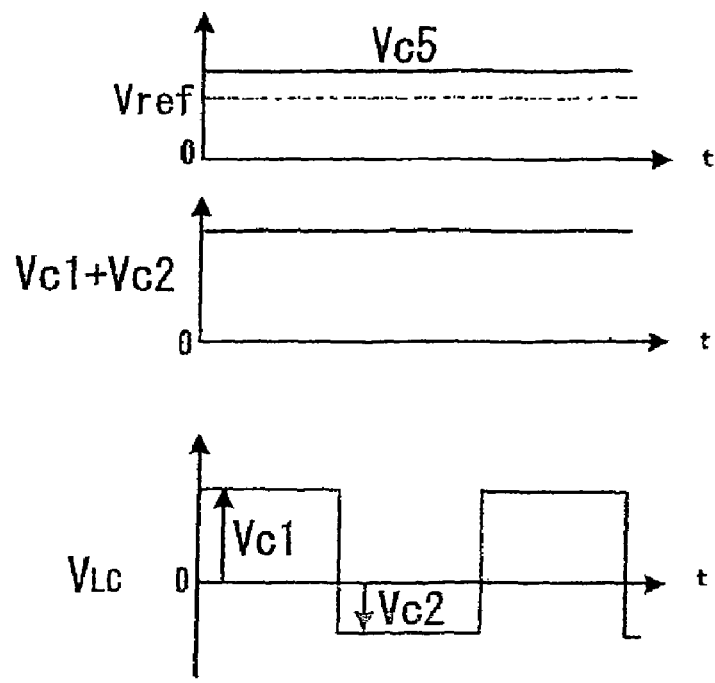
FIGS. 20A and 20B are respectively timing charts showing motion of the lighting apparatus in the tenth embodiment.
Figure 20B:
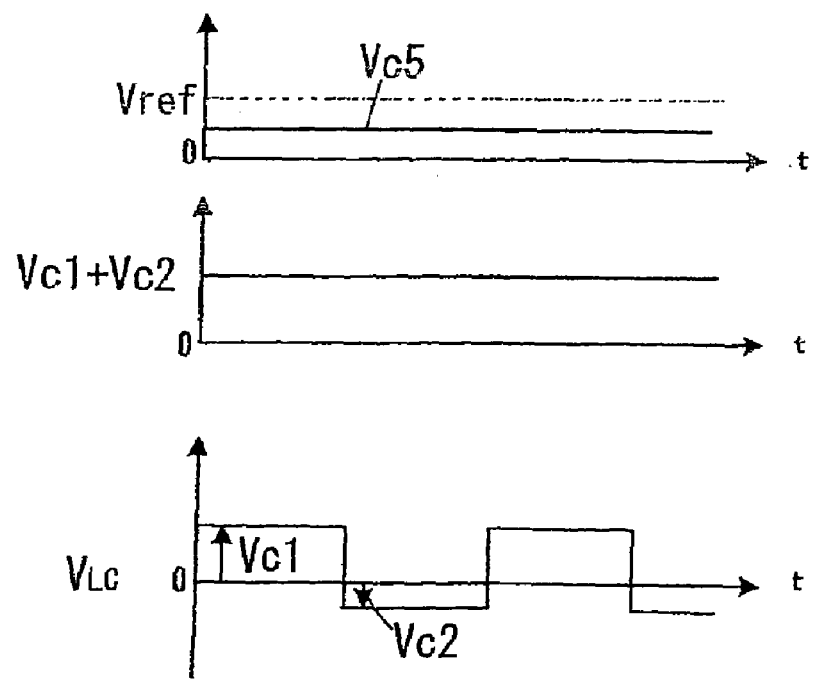

A tenth embodiment of the present invention is described. FIG. 19 shows a configuration of a lighting apparatus of high intensity discharge lamp in accordance with the tenth embodiment. FIGS. 20A and 20B respectively show waveforms of voltages Vref, Vc1+Vc2 and $V_{LC}$ when the lighting apparatus is connected to different AC power sources having different effective voltages.

In comparison with FIGS. 17 and 19, the lighting apparatus in the tenth embodiment has a voltage sensing circuit 5 for sensing the voltage of the output of the DC power supply 1A instead of the voltage sensing circuit 4. The control circuit 12 is configured to switch the output of the DC power supply 1A corresponding to the voltage sensed by the voltage sensing circuit 5.

As can be seen from FIG. 19, the voltage sensing circuit 5 is configured by a series connection of two resistors R51 and R52 connected between a terminal of the diode bridge DB and the ground, a capacitor C5 connected in parallel with the resistor R52, and a comparator 51. The voltage between output terminals of the diode bridge DB is sensed as a voltage Vc5 between the terminals of the capacitor C5. The voltage Vc5 is inputted to a negative terminal of the comparator 51, and compared with a reference voltage Vref inputted to a positive input terminal of the comparator 51. The result of comparison of the comparator 51 is used for switching the switch S12 in the control circuit 12.

The control circuit 12 in the tenth embodiment is substantially the same as that in the ninth embodiment except that reference voltages Vref1 and Vref2 (Vref1>Vref2) are applied to the terminals S121 and S122 of the switch S12.

Motions of the lighting apparatus in the tenth embodiment are described with respect to the cases that the commercial AC power sources of 100V and 200V are respectively supplied.

When the lighting apparatus is connected to the commercial AC power source Vs of 200V, the voltage Vc5 becomes higher than the reference voltage Vref, as shown in FIG. 20A. The switch S12 is turned to the terminal S121. Alternatively, when the lighting apparatus is connected to the commercial AC power source Vs of 100V, the voltage Vc5 becomes lower than the reference voltage Vref, as shown in FIG. 20B. The switch S12 is turned to the terminal S122.

In comparison with FIGS. 20A and 20B, the pulse heights Vc1 and Vc2 of the DC voltage outputted from the DC power supply 1A in the cases of commercial AC power source 200V become higher than those in the case of commercial AC power source 100V.

When the lighting apparatus is connected to the commercial AC power source having effective value 100V, it is preferable that the output voltage from the DC power supply 1A in a range from 300V to 360V. By selecting the output voltage from the DC power supply 1A in such the range, the waveform distortion of the input current, and the effect of the boosting chopper 11 can be increased.

Since the output voltage from the DC power supply 1A is varied corresponding to the effective value of the commercial AC power source Vs, it is possible to restrict unnecessary increase of the output voltage from the DC power supply 1A, even when the input value of the commercial AC power source Vs is not so high. Thus, the boosting chopper 11 can be used effective.

Figure 21:
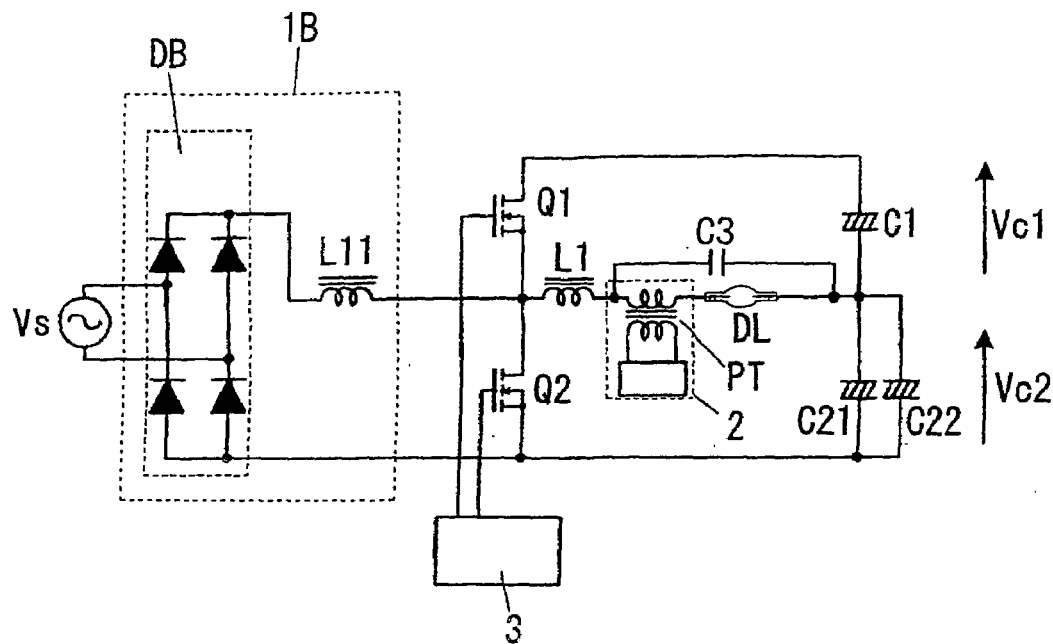
FIG. 21 is a circuit diagram of a modification of the lighting apparatus of high intensity discharge lamp in the tenth embodiment.
Figure 22:
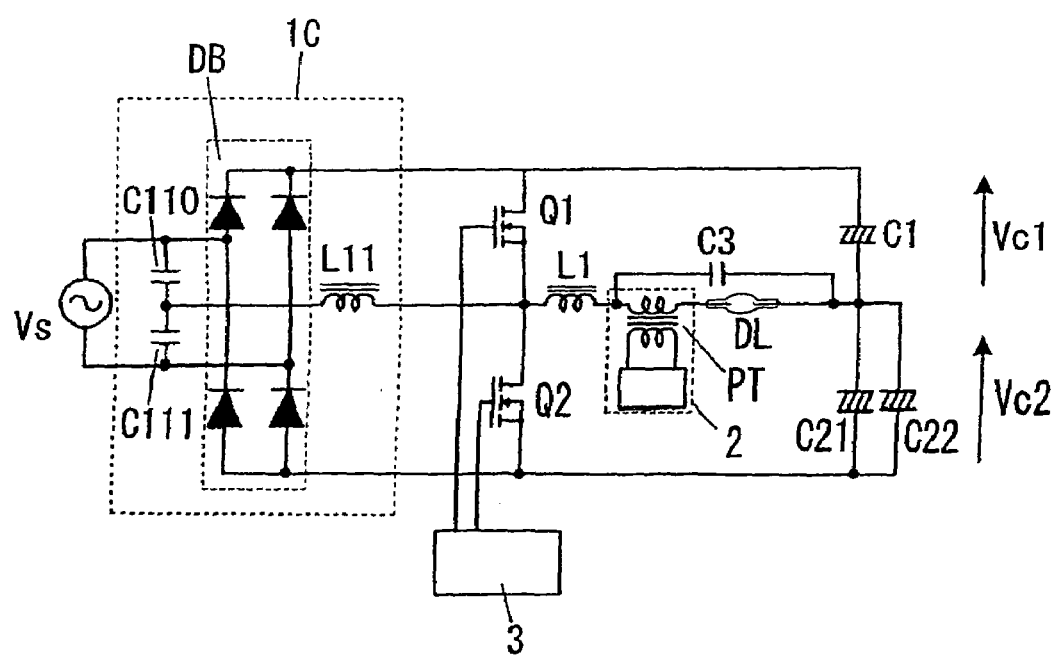
FIG. 22 is a circuit diagram of another modification of the lighting apparatus of high intensity discharge lamp in the tenth embodiment.
Figure 23:
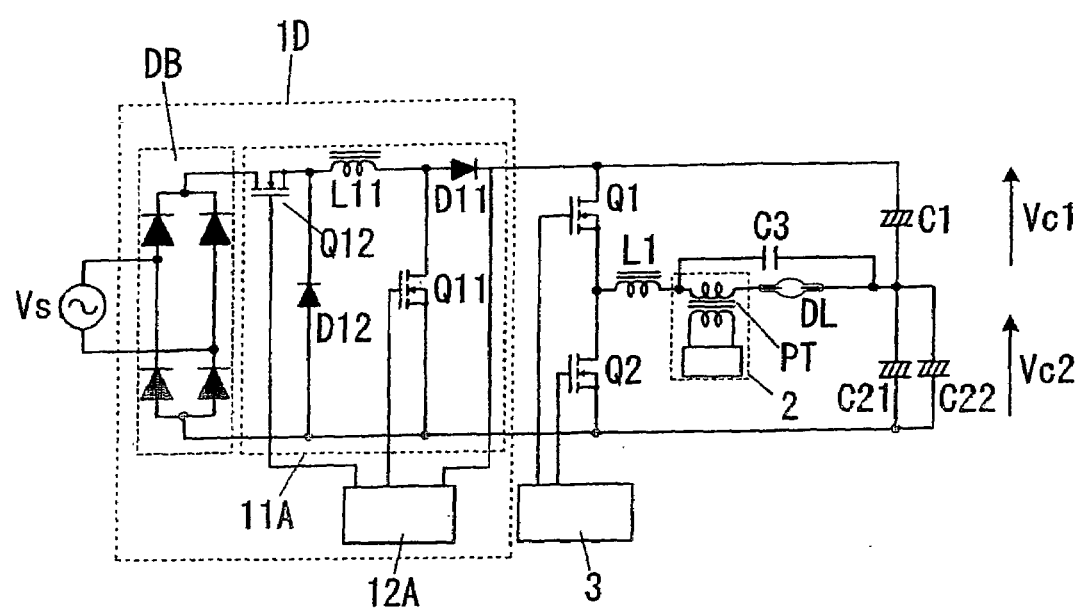
FIG. 23 is a circuit diagram of a still another modification of the lighting apparatus of high intensity discharge lamp in the tenth embodiment.

The lighting apparatus in the tenth embodiment can be modified as illustrated in FIGS. 21, 22 and 23.

A DC power supply 1B in FIG. 21 comprises only the diode bridge DB and the inductor L11. The transistor Q2 in the inverter of half-bridge circuitry serves as a function of the transistor Q11 in the boosting chopper 11 illustrated in FIG. 19.

A DC power supply 1C in FIG. 22 comprises the diode bridge DB, a series connection of capacitors C110 and C111 connected between the diodes and the inductor L11. The transistors Q1 and Q2 in the inverter serve as a function of the transistor Q11 in the boosting chopper 11.

A DC power supply 1D in FIG. 23 comprises the diode bridge DB, a boosting chopper 11 configured by two transistors QI1 and Q12, diodes D11 and D12 and the inductor L11, and a control circuit 12A for switching on and off the transistors Q11 and Q12.

In summary, it is sufficient that the DC power supply 1A can output the DC voltage in a predetermined region. The characteristics for starting up the discharge lamp DL can be improved by setting the voltages Vc1 and Vc2 uneven owing to the capacitances of the capacitors C1 and C2.

Eleventh Embodiment

Figure 24:
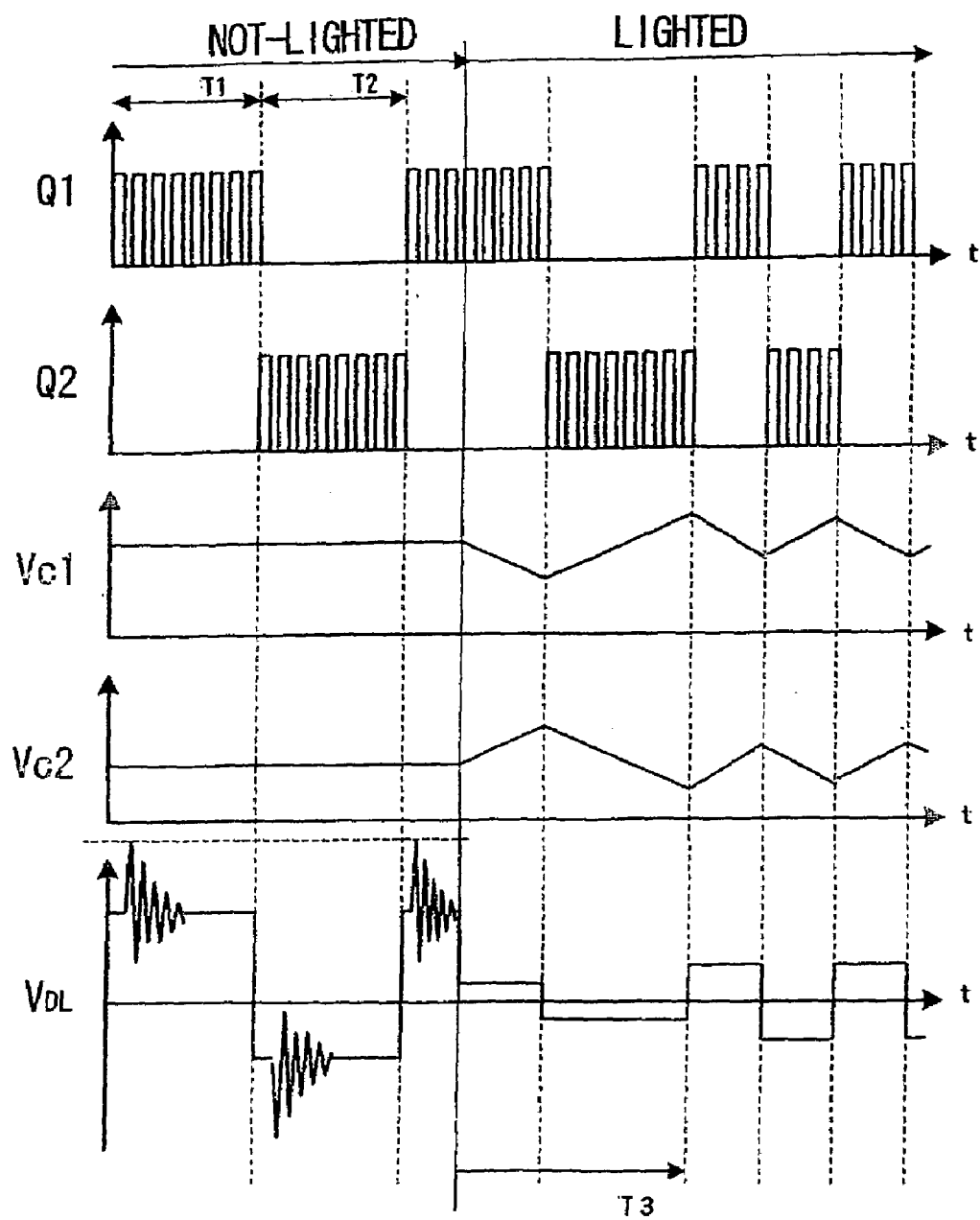
FIG. 24 is a timing chart showing motion of a lighting apparatus of high intensity discharge lamp in accordance with an eleventh embodiment of the present invention.

An eleventh embodiment of the present invention is described. FIG. 24 shows timings of switching on and off of transistors Q1 and Q2, and waveforms of voltages Vc1, Vc2 and $V_{DL}$ in a lighting apparatus in accordance with the eleventh embodiment.

The eleventh embodiment relates to driving method of the lighting apparatus. The circuitry of the lighting apparatus is, for example, substantially the same as that in the first embodiment illustrated in FIG. 1.

As can be seen from FIG. 24, the control circuit 3 switches on and off the transistors Q1 and Q2 in a manner so that a frequency of rectangular alternating voltage component of a voltage $V_{DL}$ applied to the discharge lamp DL in a predetermined term T3 after the start up of lighting of the discharge lamp DL becomes lower than that after passing the term T3.

In order to make the transition from glow discharge to arc discharge smoothly, the frequency of the rectangular alternating voltage component is set to be lower than the normal frequency in the predetermined term T3 after starting up of the lighting of the discharge lamp DL. For example, the frequency of the rectangular alternating voltage component in the term T3 is several tens Hz, and the normal frequency thereof after passing the term T3 is several hundreds Hz.

Twelfth Embodiment

Figure 25:
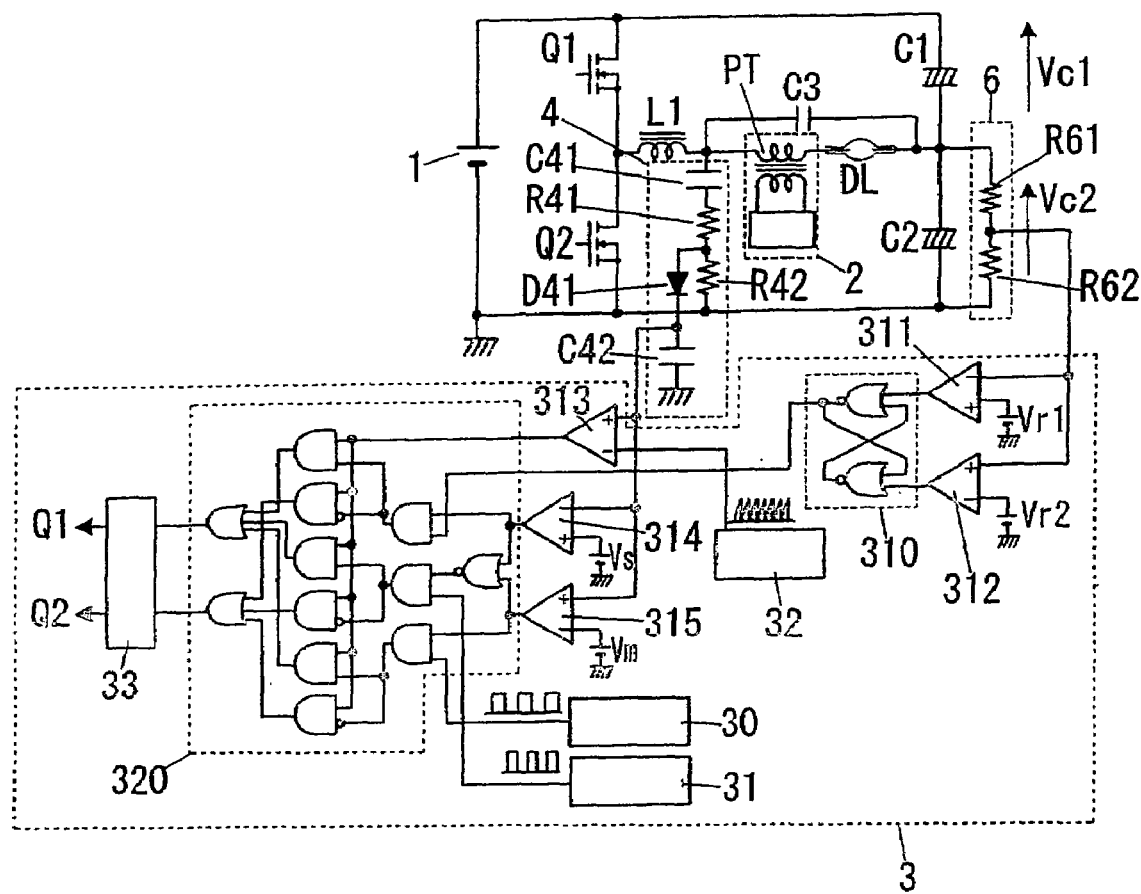
FIG. 25 is a circuit diagram of a lighting apparatus of high intensity discharge lamp in accordance with a twelfth embodiment of the present invention.
Figure 26:
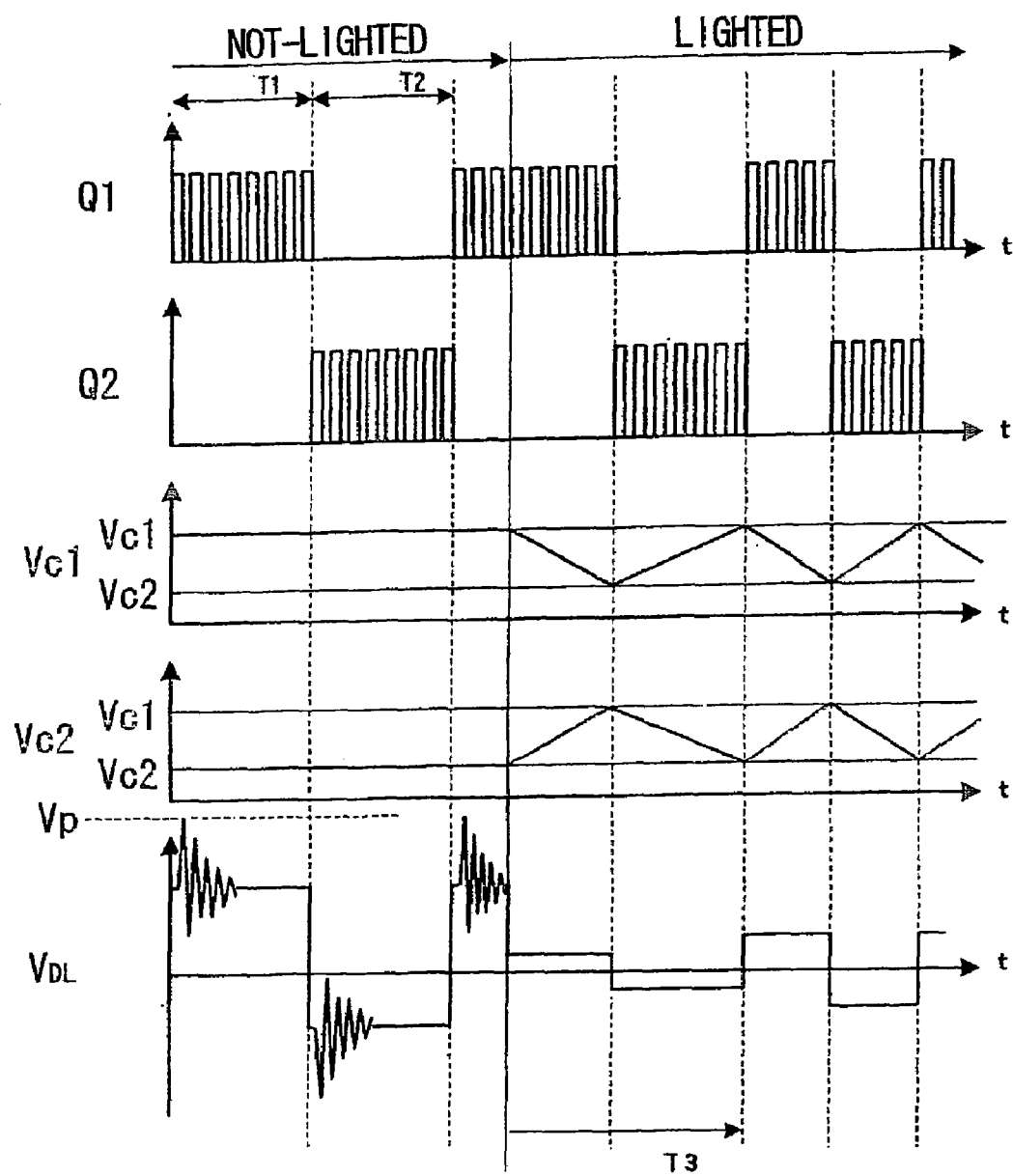
FIG. 26 is a timing chart showing motion of the lighting apparatus in the twelfth embodiment.

A twelfth embodiment of the present invention is described. FIG. 25 shows a configuration of a lighting apparatus of high intensity discharge lamp in accordance with the twelfth embodiment. FIG. 26 shows timings of switching on and off of transistors Q1 and Q2, and waveforms of voltages Vc1, Vc2 and $V_{DL}$.

In comparison with FIGS. 25 and 26, the frequency of rectangular alternating voltage component of the voltage $V_{DL}$ applied to the discharge lamp DL in the term T3 is the inverse number of a time necessary for roundly varying the voltage between terminals of at least one of the capacitors C1 and C2 from the higher voltage Vc1 to the lower voltage Vc2, roundly.

As can be seen from FIG. 25, the lighting apparatus has a voltage sensing circuit 4 similar to that in the ninth embodiment, and a voltage sensing circuit 6 configured by resistors R61 and R62 for sensing voltages of terminals of the capacitors C1 and C2, further to the circuitry illustrated in FIG. 1. The control circuit 3 is configured by low frequency oscillators 30 and 31, a high frequency oscillator 32, a driving circuit 33, a flip-flop 310, a plurality of comparators 311 to 315 and a logic circuit 320. The control circuit 3 switches on and off the transistors Q1 and Q2 corresponding to the voltages sensed by the voltage sensing circuits 4 and 6, as shown in FIG. 26.

While the discharge lamp DL has not been lighted, the low frequency of the rectangular alternating voltage component is set to be, for example, several tens Hz. High frequency and high voltage pulses Vp due to the ignitor 2 are superimposed on the rectangular alternating voltage component, so that the voltage $V_{DL}$ applied to the discharge lamp DL has the waveform as illustrated in FIG. 26.

While the discharge lamp DL has been lighted, the transistors Q1 and Q2 are switched on and off in a manner so that the frequency of the rectangular alternating voltage component of the voltage $V_{DL}$ in the term T3 after starting up of lighting of the discharge lamp DL becomes lower than that after passing the term T3. The frequency of the rectangular alternating voltage component in the term T3 is defined by the voltages Vc1 and Vc2 of the capacitors C1 and C2.

By such controls, if the extinction of the discharge lamp DL occurs due to inversion of negative phase and positive phase of the voltage $V_{DL}$ applied to the discharge lamp DL, the rectangular alternating voltage component with low frequency is applied to the discharge lamp DL, similarly to the state that the discharge lamp DL has not been lighted. As a result, restarting characteristics of the discharge lamp DL can be increased.

Thirteenth Embodiment

Figure 27:
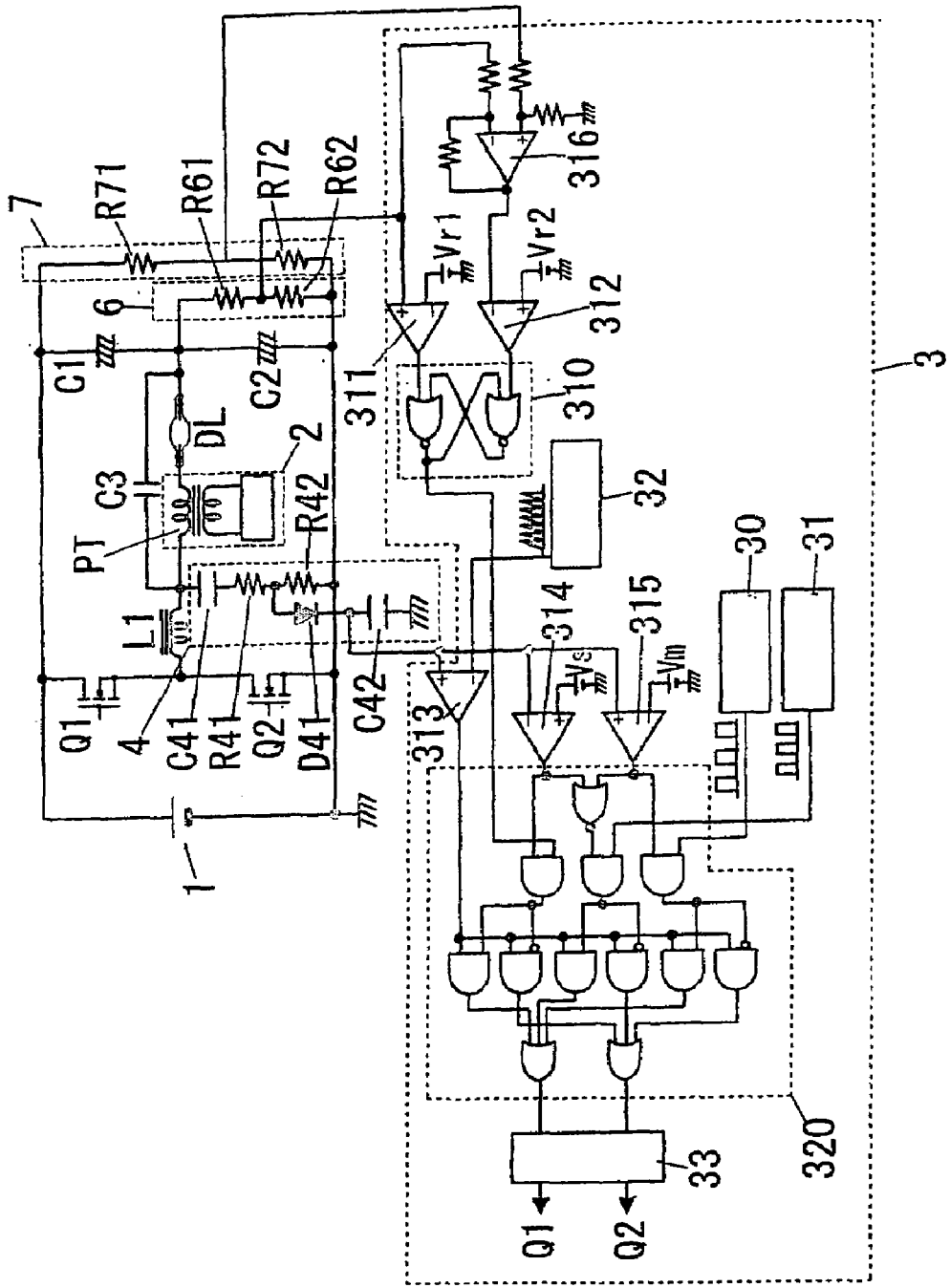
FIG. 27 is a circuit diagram of a lighting apparatus of high intensity discharge lamp in accordance with a thirteenth embodiment of the present invention.
Figure 28:
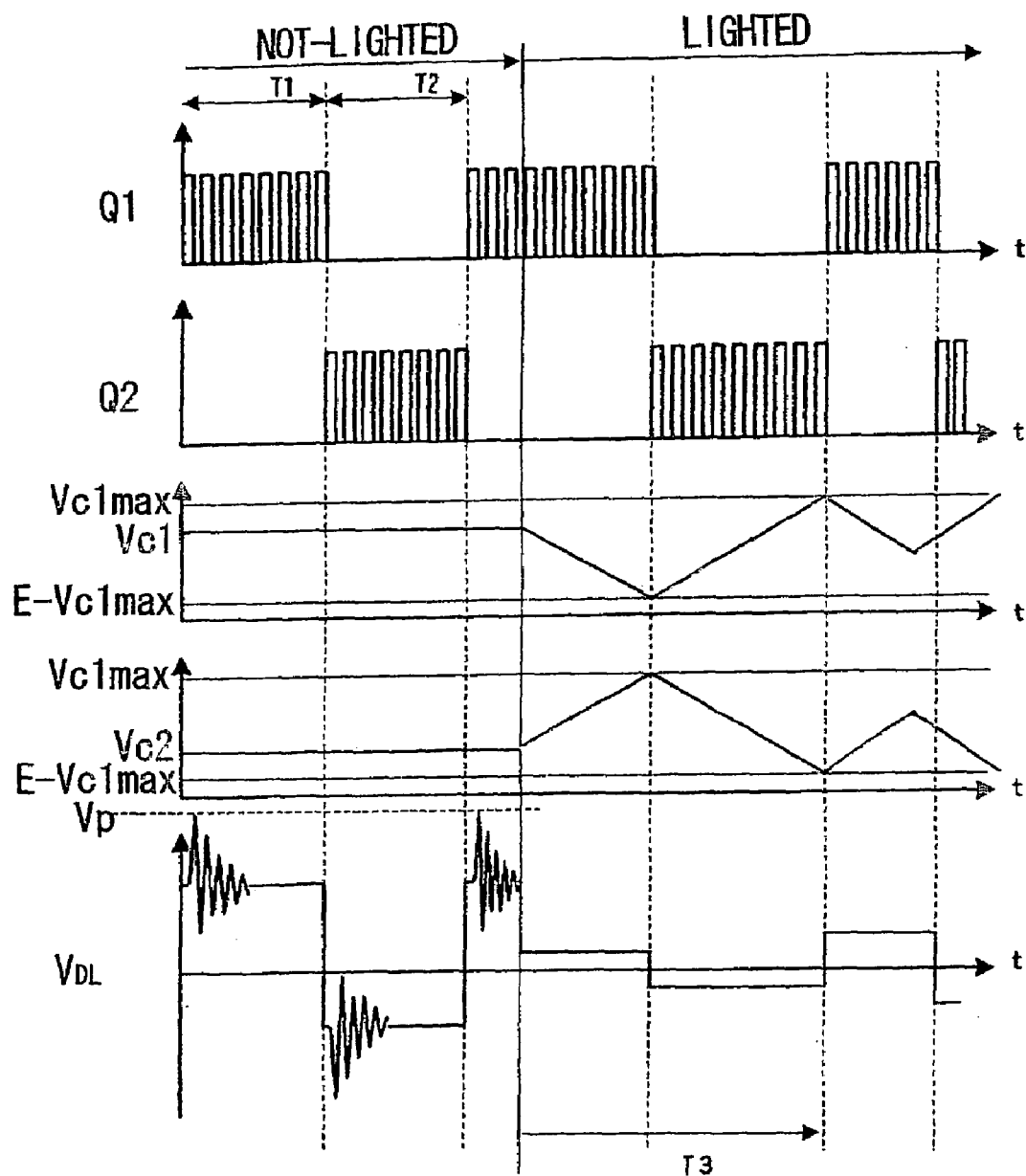
FIG. 28 is a timing chart showing motion of the lighting apparatus in the thirteenth embodiment.

A thirteenth embodiment of the present invention is described. FIG. 27 shows a configuration of a lighting apparatus of high intensity discharge lamp in accordance with the thirteenth embodiment. FIG. 28 shows timings of switching on and off of transistors Q1 and Q2, and waveforms of voltages Vc1, Vc2 and $V_{DL}$.

In comparison with FIGS. 25 and 28, the frequency of rectangular alternating voltage component of the voltage $V_{DL}$ applied to the discharge lamp DL in the term T3 is the inverse number of a time necessary for roundly varying the voltage between terminals of at least one of the capacitors C1 and C2 from a voltage Vc1max to a voltage E-Vc1max. Hereupon, the voltage Vc1max is the largest value of the voltage Vc1 applicable to the capacitances C1 and C2. The voltage E is the output voltage from the DC power supply 1A.

As can be seen from FIG. 27, the lighting apparatus has a voltage sensing circuit 4 and a voltage sensing circuit 6 similar to those in the eleventh embodiment, and a voltage sensing circuit 7 configured by resistors R71 and R72 for sensing the output voltage E of the DC power supply 1A, further to the circuitry illustrated in FIG. 1. The control circuit 3 is configured by low frequency oscillators 30 and 31, a high frequency oscillator 32, a driving circuit 33, a flip-flop 310, a plurality of comparators 311 to 315, an operational amplifier 316 and a logic circuit 320. The control circuit 3 switches on and off the transistors Q1 and Q2 corresponding to the voltages sensed by the voltage sensing circuits 4, 6 and 7, as shown in FIG. 28.

While the discharge lamp DL has not been lighted, the low frequency of the rectangular alternating voltage component is set to be, for example, several tens Hz. High frequency and high voltage pulses Vp due to the ignitor 2 are superimposed on the rectangular alternating voltage component, so that the voltage $V_{DL}$ applied to the discharge lamp DL has the waveform as illustrated in FIG. 28.

While the discharge lamp DL has been lighted, the transistors Q1 and Q2 are switched on and off in a manner so that the frequency of the rectangular alternating voltage component of the voltage $V_{DL}$ in the term T3 after starting up of lighting of the discharge lamp DL becomes lower than that after passing the term T3. The frequency of the rectangular alternating voltage component in the term T3 is defined by the largest voltage applicable to the capacitors C1 and C2.

It is assumed that the output voltage E of the DC power supply 1A is 450V and the largest voltage applicable to the capacitors C1 and C2 is 420V. The frequency of the rectangular alternating voltage component in the term T3 is defined by the time necessary for roundly varying the voltage Vc1 and Vc2 between terminals of the capacitors C1 and C2 from 420V to 30V (=450V−420V). In the circuit illustrated in FIG. 27, voltages Vr1 and Vr2 are respectively selected to be the values of Vc1max and E-Vc1max.

By such controls, the discharge of the discharge lamp DL can be stabilized owing to reduce the number of inversion of negative phase and positive phase of the voltages $V_{DL}$ in the term T3 just after start up of lighting.

Fourteenth Embodiment

Figure 29:
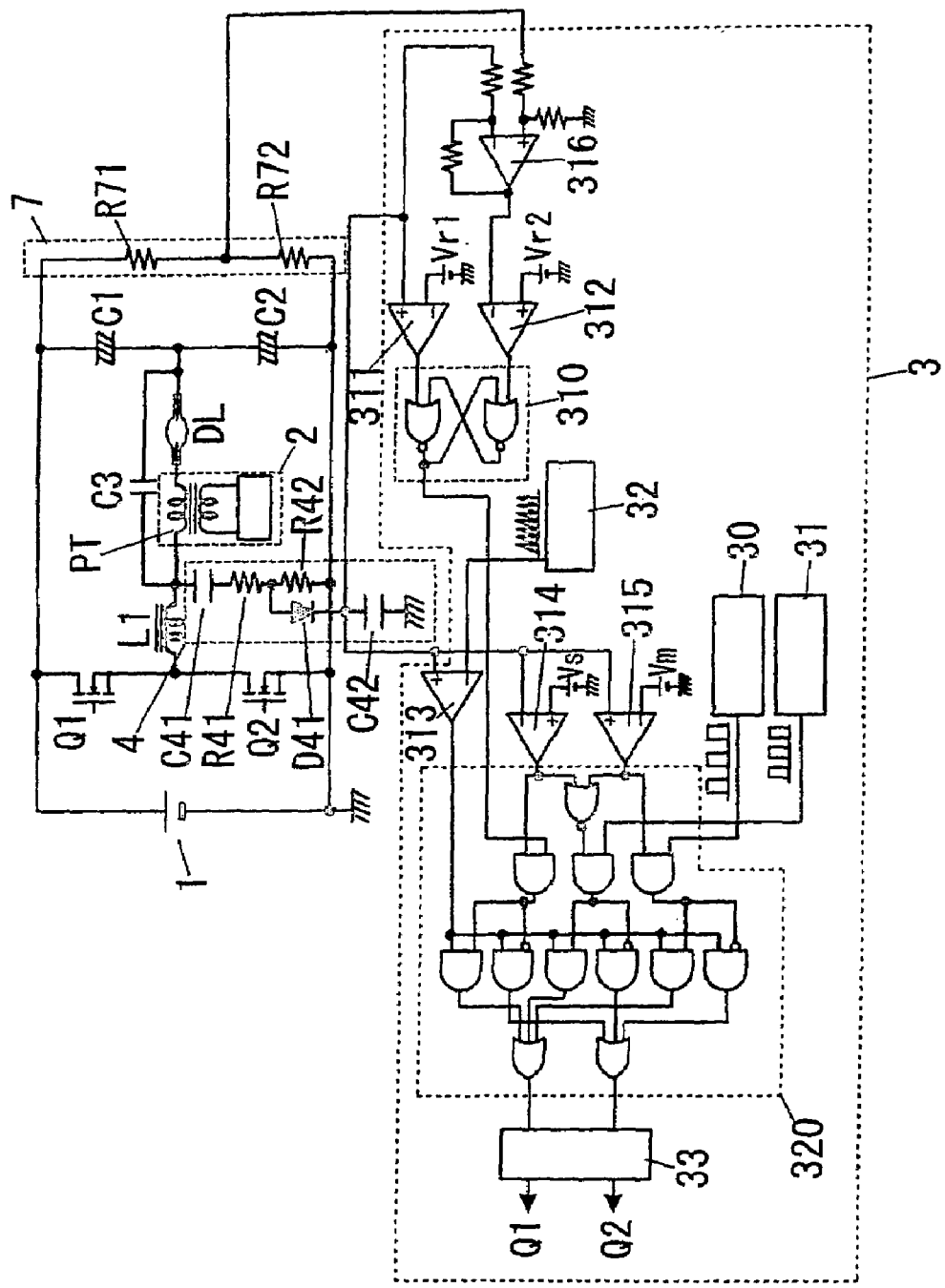
FIG. 29 is a circuit diagram of a lighting apparatus of high intensity discharge lamp in accordance with a fourteenth embodiment of the present invention.
Figure 30:
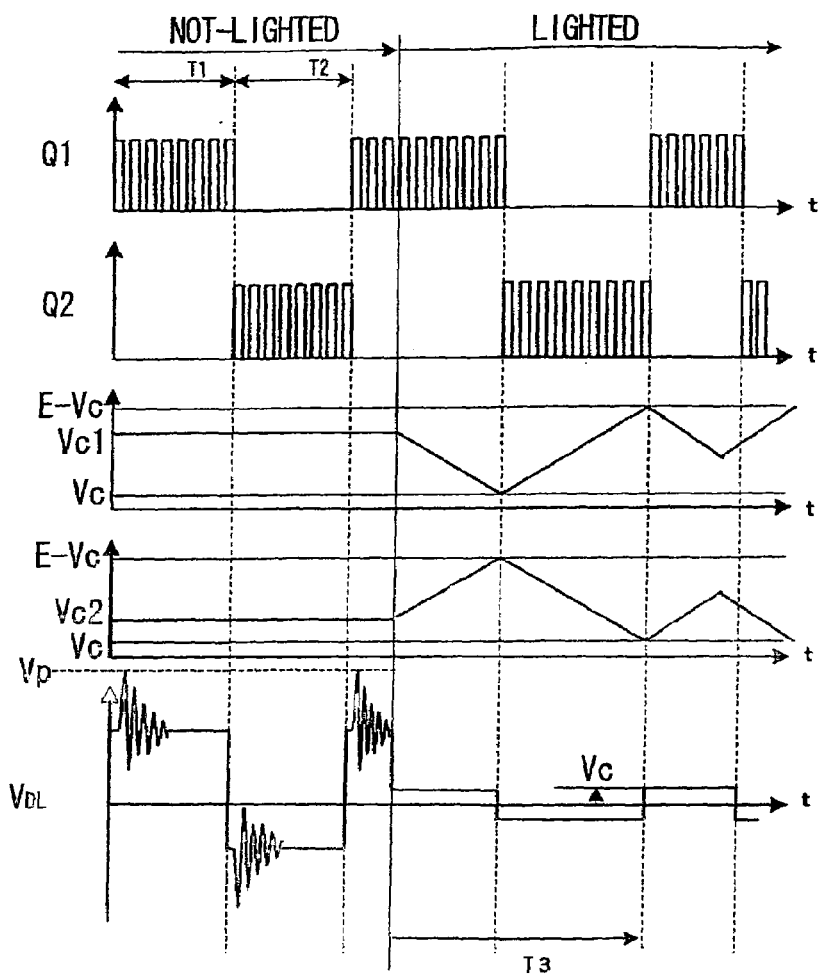
FIG. 30 is a timing chart showing motion of the lighting apparatus in the fourteenth embodiment.

A fourteenth embodiment of the present invention is described. FIG. 29 shows a configuration of a lighting apparatus of high intensity discharge lamp in accordance with the fourteenth embodiment. FIG. 30 shows timings of switching on and off of transistors Q1 and Q2, and waveforms of voltages Vc1, Vc2 and $V_{DL}$.

In comparison with FIGS. 25 and 30, the frequency of rectangular alternating voltage component of the voltage $V_{DL}$ applied to the discharge lamp DL in the term T3 is the inverse number of a time necessary for roundly varying the voltage between terminals of at least one of the capacitors C1 and C2 from a predetermined voltage Vc to a voltage E-Vc. Hereupon, the voltage E is the output voltage from the DC power supply 1A.

As can be seen from FIG. 29, the lighting apparatus has a voltage sensing circuit 4 and a voltage sensing circuit 7 similar to those in the thirteenth embodiment, further to the circuitry illustrated in FIG. 1. The control circuit 3 is configured by low frequency oscillators 30 and 31, a high frequency oscillator 32, a driving circuit 33, a flip-flop 310, a plurality of comparators 311 to 315, an operational amplifier 316 and a logic circuit 320. The control circuit 3 switches on and off the transistors Q1 and Q2 corresponding to the voltages sensed by the voltage sensing circuits 4 and 7, as shown in FIG. 30.

While the discharge lamp DL has not been lighted, the low frequency of the rectangular alternating voltage component is set to be, for example, several tens Hz. High frequency and high voltage pulses Vp due to the ignitor 2 are superimposed on the rectangular alternating voltage component, so that the voltage $V_{DL}$ applied to the discharge lamp DL has the waveform as illustrated in FIG. 30.

While the discharge lamp DL has been lighted, the transistors Q1 and Q2 are switched on and off in a manner so that the frequency of the rectangular alternating voltage component of the voltage $V_{DL}$ in the term T3 after starting up of lighting of the discharge lamp DL becomes lower than that after passing the term T3. The frequency of the rectangular alternating voltage component in the term T3 is defined by the voltage Vc of the discharge lamp DL just after passing the term T3. The value of the voltage Vc is not sensed after passing the term T3, but known experientially.

It is assumed that the discharge lamp DL is started up the lighting at the output voltage E of the DC power supply 1A is 450V, and the voltage Vc of the discharge lamp DL just after the starting up of the lighting is experientially known as about 50V. The frequency of the rectangular alternating voltage component, that is the timings of inverting the negative and positive phases of the rectangular alternating voltage component is defined by the time necessary for roundly varying the voltages Vc1 and Vc2 of the capacitors C1 and C2 from 50V to 400V (=450V−50V). In the circuit illustrated in FIG. 29, voltages Vr1 and Vr2 are respectively selected to the values of Vc and E-Vc. Hereupon, it is generally known that the shorter the term T3 is, the lower the voltage of the discharge lamp DL becomes.

By such controls, electric power can surely be supplied to the discharge lamp DL after passing the predetermined term T3, so that the discharge of the discharge lamp DL can be made stable. Subsequently, the voltages Vc1 and Vc2 between the terminals of the capacitors C1 and C2 serving for supplying the electric power to the discharge lamp DL can be made higher, so that the extinction of the discharge lamp DL due to the inversion of the rectangular alternating voltage component of the voltage $V_{DL}$ can be prevented.

Fifteenth Embodiment

Figure 31:
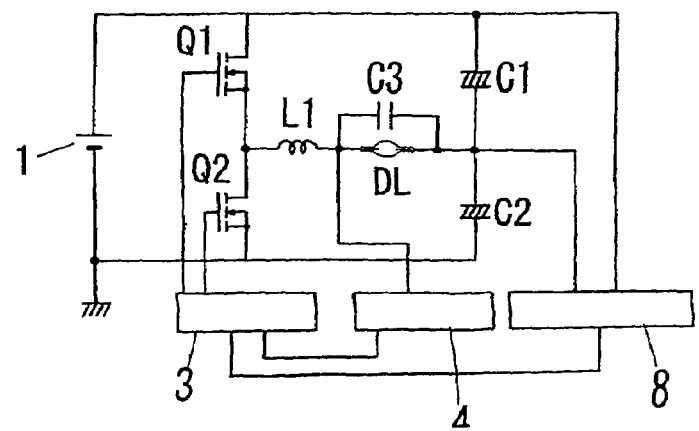
FIG. 31 is a circuit diagram of a lighting apparatus of high intensity discharge lamp in accordance with a fifteenth embodiment of the present invention.
Figure 32:
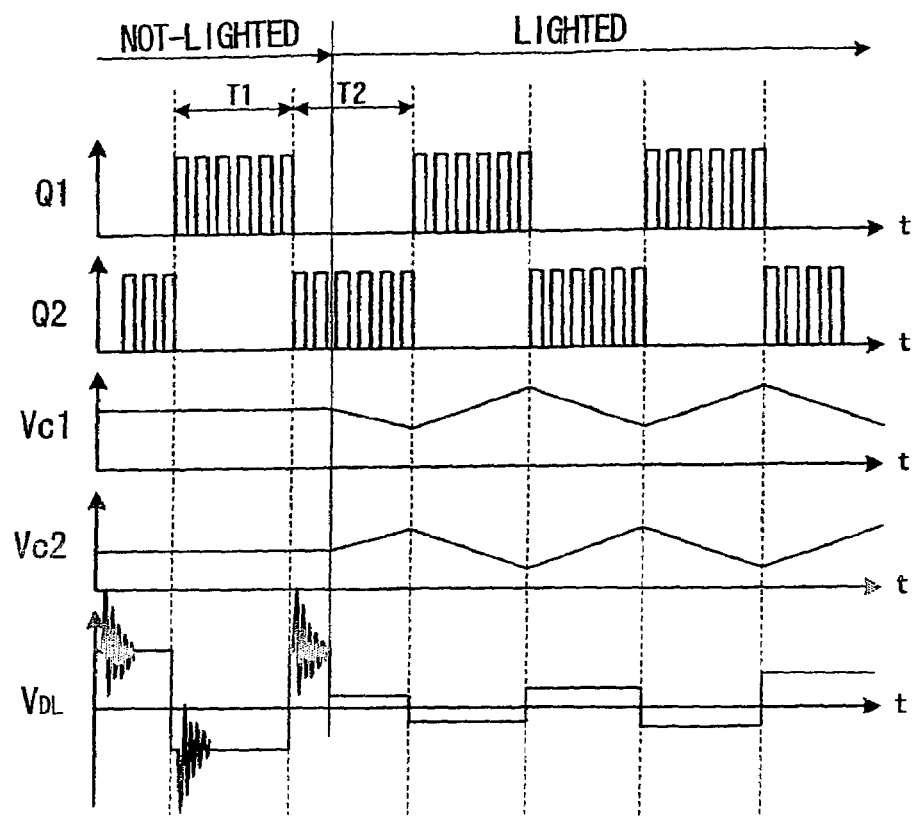
FIG. 32 is a timing chart showing motion of the lighting apparatus in the fifteenth embodiment.

A fifteenth embodiment of the present invention is described. FIG. 31 shows a configuration of a lighting apparatus of high intensity discharge lamp in accordance with the fifteenth embodiment. FIG. 32 shows timings of switching on and off of transistors Q1 and Q2, and waveforms of voltages Vc1, Vc2 and $V_{DL}$.

As can be seen from FIG. 31, the lighting apparatus has a voltage sensing circuit 4 and a voltage sensing circuit 8 for sensing voltages between the terminals of the capacitors C1 and C2, further to the circuitry illustrated in FIG. 1. The control circuit 3 switches on and off the transistors Q1 and Q2 utilizing the voltage of the discharge lamp DL and the voltage of at least one of the capacitors C1 and C2. In FIG. 31, the ignitor 2 is omitted the illustration.

In the fifteenth embodiment, in a half period of the rectangular alternating voltage component of the voltage $V_{DL}$ applied to the discharge lamp DL, a sensing result of the voltage of the discharge lamp DL is used for switching on and off the transistors Q1 and Q2. In the rest half period of the rectangular alternating voltage component of the voltage $V_{DL}$, a sensing result of the voltage of at least one of the capacitors C1 and C2 is used.

Specifically, in one phase of the voltage $V_{DL}$, electric current flows in a loop configured by the capacitor C1, the transistor Q1, the inductor L1 and the discharge lamp DL (and the capacitor C3). In such period, the voltage of the discharge lamp DL is sensed by the voltage sensing circuit 4, and a proper electric power is supplied to the discharge lamp DL corresponding to the state of the discharge lamp DL.

In the other phase of the voltage $V_{DL}$, electric current flows in a loop configured by the capacitor C2, the discharge lamp DL (and the capacitor C3), the inductor L1 and the transistor Q2. In such period, the voltages of the capacitors C1 and C2 are sensed by the voltage sensing circuit 8. The control circuit 3 switched on and off the transistor Q2 in a manner so that the voltage $V_{DL}$ applied to the discharge lamp DL has the pulse heights Vc1 and Vc2 which are the pulse heights of the voltage applied to the discharge lamp DL while the discharge lamp DL has not been lighted.

By such the configuration, it is possible to apply the voltage $V_{DL}$ having the same pulse heights in the negative and positive phases with maintaining the unbalance of the voltages Vc1 and Vc2 of the capacitor C1 and C2 in a term while the discharge lamp DL has not been lighted.

Sixteenth Embodiment

Figure 33:
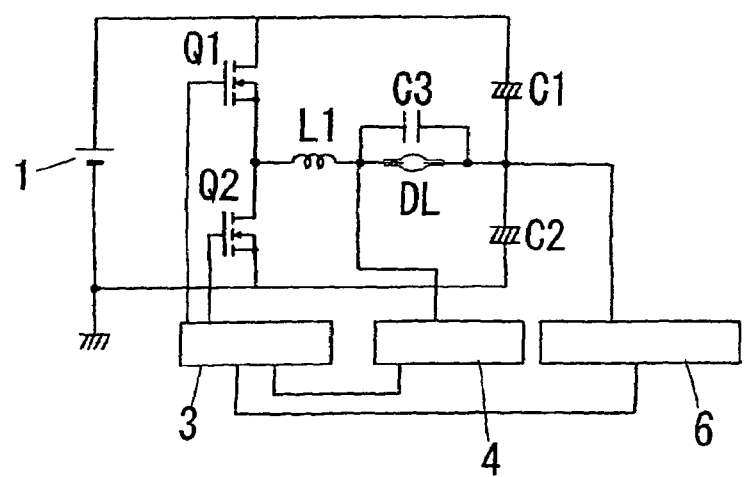
FIG. 33 is a circuit diagram of a lighting apparatus of high intensity discharge lamp in accordance with a sixteenth embodiment of the present invention.

A sixteenth embodiment of the present invention is described. FIG. 33 shows a configuration of a lighting apparatus of high intensity discharge lamp in accordance with the sixteenth embodiment.

In comparison with the fifteenth embodiment, the lighting apparatus in the sixteenth embodiment illustrated in FIG. 33 comprises a voltage sensing circuit 6 for sensing the voltage of both terminals of the capacitor C2 instead of the voltage sensing circuit 8. In a half period of the rectangular alternating voltage component of the voltage $V_{DL}$ applied to the discharge lamp DL, a sensing result of the voltage of the discharge lamp DL is used for switching on and off the transistors Q1 and Q2. In the rest half period of the rectangular alternating voltage component of the voltage $V_{DL}$, a sensing result of the voltage of the capacitor C2 is used. In FIG. 33, the ignitor 2 is omitted the illustration.

In the sixteenth embodiment, since the control circuit 3 uses only the voltage of the capacitor C2 for switching on and off the transistor Q2 in the half period of the rectangular alternating voltage component of the voltage $V_{DL}$ applied to the discharge lamp DL, the voltage sensing circuit 6 can directly sense the voltage of the capacitor C2 from the reference voltage. Thus, the voltage sensing circuit 6 can be simplified.

Furthermore, when the capacitance of the capacitor C2 is made larger than that of the capacitor C1 for applying the voltage $V_{DL}$ having different pulse heights in the negative and positive phases to the discharge lamp DL corresponding to the frequencies of the rectangular alternating voltage component, it is possible to reduce the power loss due to resistors for sensing the voltage in the sensing of the voltage Vc2 by voltage division of the resistors.

Seventeenth Embodiment

Figure 34:
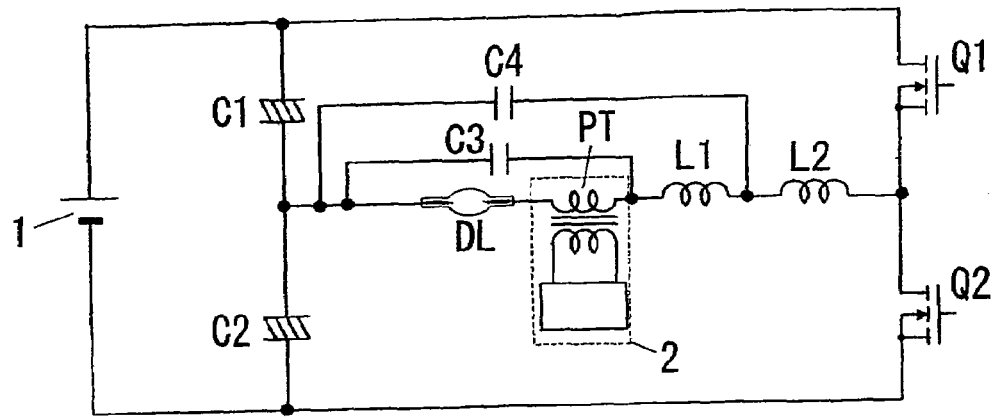
FIG. 34 is a circuit diagram of a lighting apparatus of high intensity discharge lamp in accordance with a seventeenth embodiment of the present invention.
Figure 35:
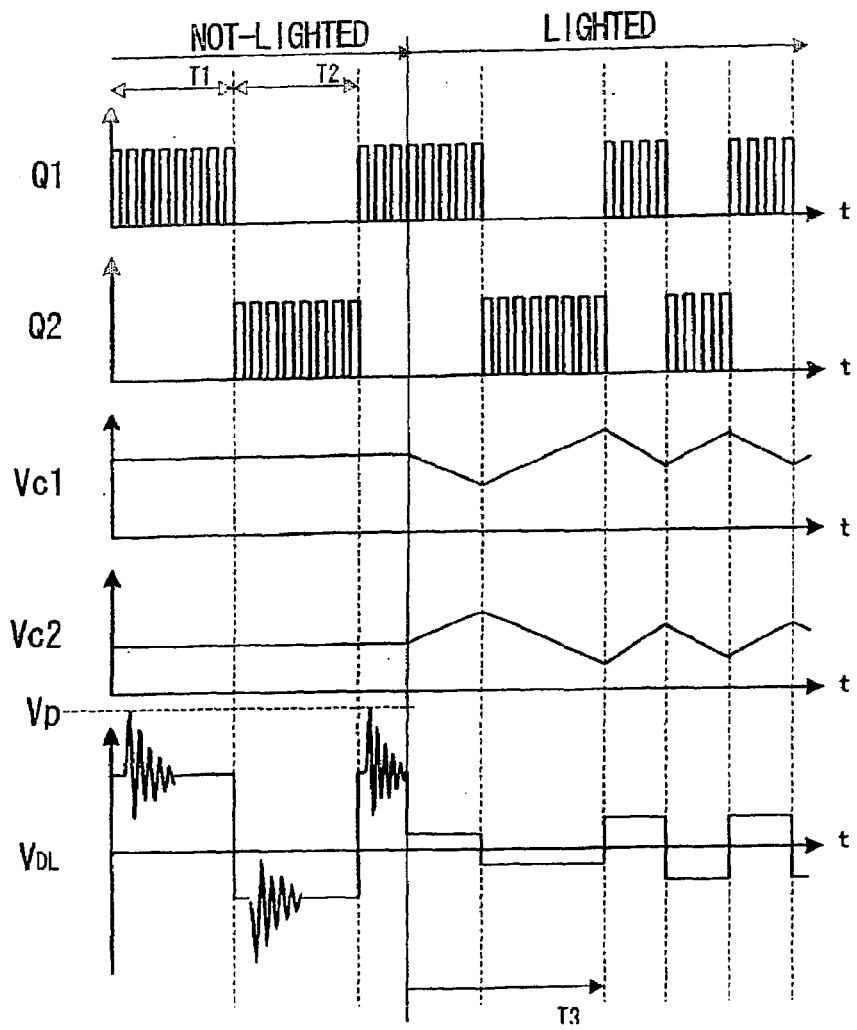
FIG. 35 is a timing chart showing motion of the lighting apparatus in the seventeenth embodiment.
Figure 36:
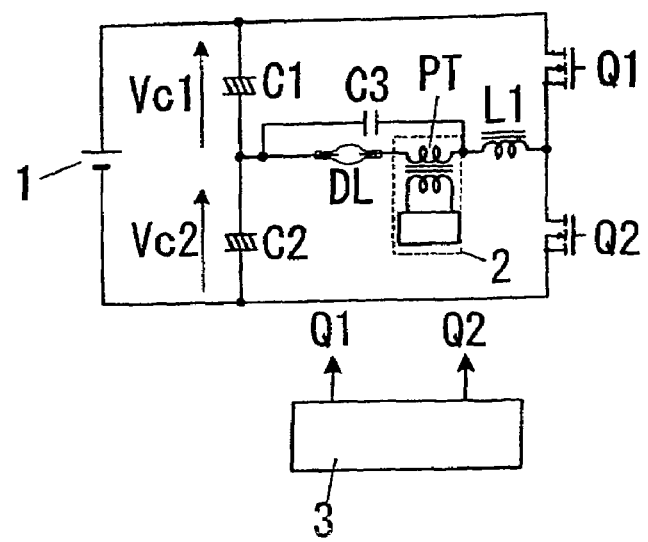
FIG. 36 is a circuit diagram showing a fundamental configuration of the lighting apparatus in the seventeenth embodiment.
Figure 37:
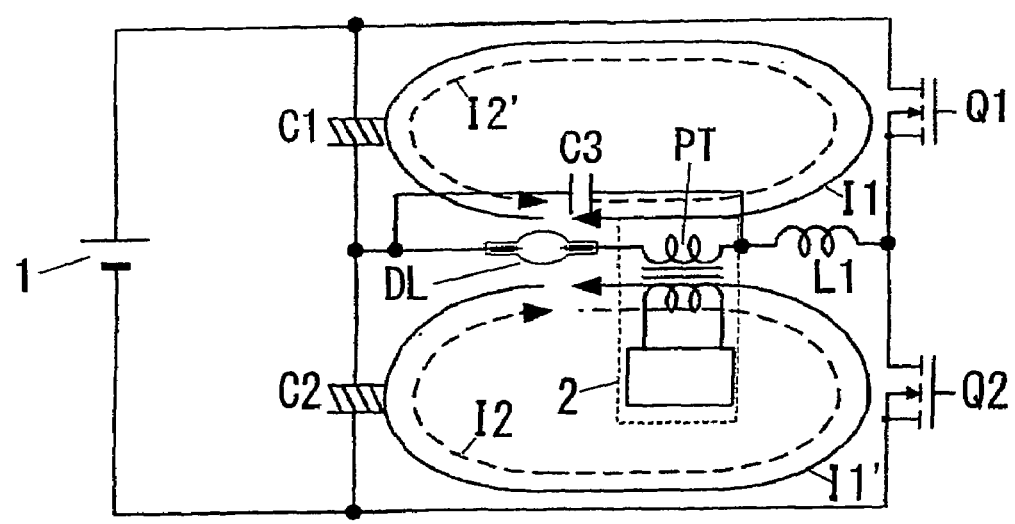
FIG. 37 is a circuit diagram for showing a reason for modifying the configuration from the fundamental configuration to the configuration in the seventeenth embodiment.
Figure 38:
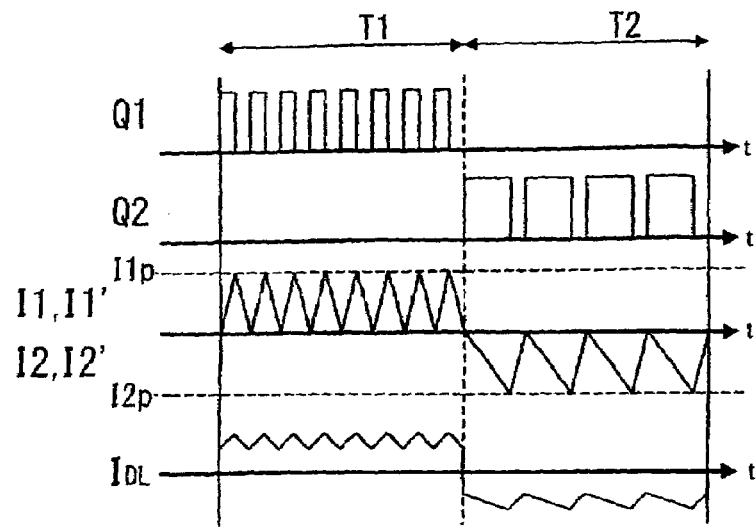
FIG. 38 is a timing chart showing motion of the lighting apparatus having the fundamental configuration.
Figure 39:
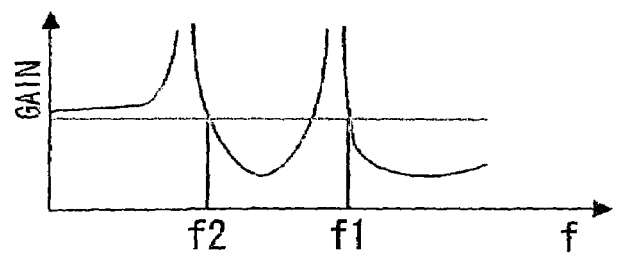
FIG. 39 is a graph showing a characteristic of gain-frequency of low-pass filters of the lighting apparatus in the seventeenth embodiment.

A seventeenth embodiment of the present invention is described. FIG. 34 shows a configuration of a lighting apparatus of high intensity discharge lamp in accordance with the seventeenth embodiment. FIG. 35 shows timings of switching on and off of transistors Q1 and Q2, and waveforms of voltages Vc1, Vc2 and $V_{DL}$. FIG. 36 shows a fundamental configuration of the lighting apparatus in the seventeenth embodiment. FIG. 37 shows a reason for modifying the configuration from the fundamental configuration illustrated in FIG. 36 to the configuration illustrated in FIG. 34. FIG. 38 shows timings of switching on and off of transistors Q1 and Q2, and waveforms of currents I1, I2 and $I_{DL}$. FIG. 39 shows a characteristic of gain-frequency of low-pass filters of the lighting apparatus in the seventeenth embodiment.

In comparison with FIGS. 1 and 34, the lighting apparatus in the seventeenth embodiment has essentially the same configuration as that in the first embodiment. The control circuit 3 (not illustrated in FIG. 34) not only switches on and off the transistors Q1 and Q2 as shown in FIG. 35, but also controls current flowing in the inductor L1. The inductor L1 and the capacitor C3 configures a first low-pass filter and an inductor L2 and a capacitor C4 configures a second low-pass filter, so that the gain of the double low-pass filters in the negative and positive phases of a current $I_{DL}$ flowing in the discharge lamp DL become substantially the same.

In the fundamental configuration of the lighting apparatus illustrated in FIG. 36, when the transistor Q2 is switched off and the transistor Q1 is switched on as shown in FIG. 37, a current I1 flows from the capacitor C1 to the discharge lamp DL (and the capacitor C3) through the transistor Q1 and the inductor L1, so that electric energy is stored in the inductor L1. Subsequently, when the electric energy stored in the inductor L1 is released, current I1' flows from the inductor L1 to the discharge lamp DL (and the capacitor C3) through the capacitor C2 and a parasitic diode of the transistor Q2.

Alternatively, when the transistor Q1 is switched off and the transistor Q1 is switched on, a current I2 flows from the capacitor C2 to the discharge lamp DL (and the capacitor C3) through the inductor L1 and the transistor Q2, so that electric energy is stored in the inductor L1. Subsequently, when the electric energy stored in the inductor L1 is released, current I2' flows from the inductor L1 to the discharge lamp DL (and the capacitor C3) through a parasitic diode of the transistor Q1 and the capacitor C1.

For example, in the BCM control that the voltages between both terminals of the capacitors C1 and C2 are respectively 300V and 150V, when the voltage of the discharge lamp DL is 90V, a ratio of widths of on time period and off time period of the transistor Q1 becomes 8:7, and a ratio of widths of on time period and off time period of the transistor Q2 becomes 13:2. When the ratios of widths of on time period and off time period of the transistors Q1 and Q2 are different, the switching frequency of the transistor Q1 naturally becomes higher than the switching frequency of the transistor Q2, as shown in FIG. 38. The gain (Vout/Vin) of the low-pass filter configured by the inductor L1 and the capacitor C3 varies corresponding to the difference of the switching frequencies of the transistors q1 and Q2. Thus, the content of ripple contained in the current $I_{DL}$ flowing in the discharge lamp DL in the term T1 will be different from that in the term T2 due to switching on and off of the transistors Q1 and Q2.

In the high intensity discharge lamp, when the contents of ripple in the current $I_{DL}$ flowing in the discharge lamp DL are extremely different corresponding to the negative and positive phases, it will cause the flicker or acoustic resonance of the discharge lamp DL. Thus, it is preferable to supply the current $I_{DL}$ having the same characteristics in the negative and positive phases to the discharge lamp DL.

In the seventeenth embodiment, in order to make the content of ripple in the current $I_{DL}$ in the negative be the same as that in the positive phase, the capacitor C4 is connected in parallel with a series connection of the inductor L1, the ignitor 2 and the discharge lamp DL, and the inductor L2 is connected between the connection point of the capacitors Q1 and Q2 and the inductor L1. Since the capacitor C4 and the inductor L2 configures a filter, so that the lighting apparatus in the seventeenth embodiment has double low-pass filters configured by the capacitor C3 and the inductor L1, and the capacitor C4 and the inductor L2. Thus, the low-pass filter of the lighting apparatus in the seventeenth embodiment has the characteristic of gain-frequency shown in FIG. 39.

Even though the switching frequency of the transistor Q1 is different from that of the transistor Q2, it is possible to obtain substantially the same gains owing to the switching operation of the transistors Q1 and Q2, so that the contents of ripple in the current $I_{DL}$ flowing in the discharge lamp DL in the negative and positive phases become substantially the same.

Eighteenth Embodiment

Figure 40:
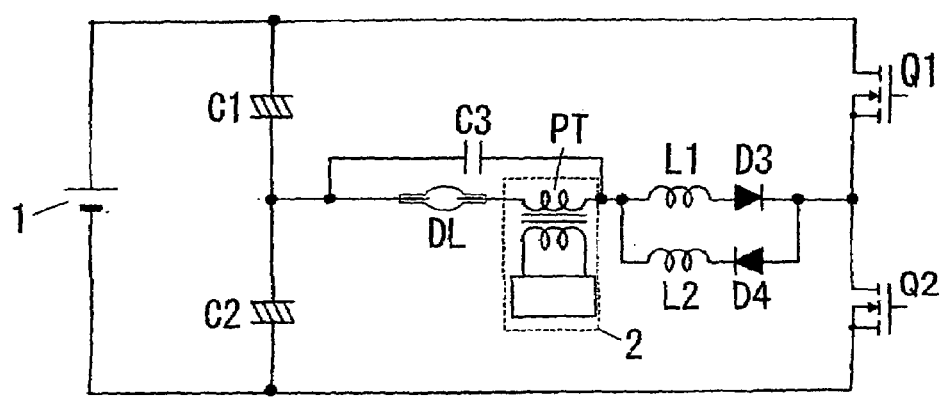
FIG. 40 is a circuit diagram of a lighting apparatus of high intensity discharge lamp in accordance with an eighteenth embodiment of the present invention.

An eighteenth embodiment of the present invention is described. FIG. 40 shows a configuration of a lighting apparatus of high intensity discharge lamp in accordance with the eighteenth embodiment.

In comparison with the seventeenth embodiment, the lighting apparatus in the eighteenth embodiment illustrated in FIG. 40 varies a value of inductance of the inductor L1 corresponding to the negative and positive phases of a current flowing in the inductor L1.

The lighting apparatus comprises a parallel connection of series connection of the inductor L1 and a diode D3 and a series connection of the inductor L2 and a diode D4, which is connected between the connection point of the transistors Q1 and Q2 and the ignitor 2. The diodes D3 and D4 are respectively connected in the opposite directions.

When the transistor Q2 is switched off and the transistor Q1 is switched on, a current flows from the capacitor C1 to the discharge lamp DL (and the capacitor C3) through the transistor Q1, the diode D4 and the inductor L2, so that electric energy is stored in the inductor L2. Subsequently, when the electric energy stored in the inductor L2 is released, a current flows from the inductor L2 to the discharge lamp DL (and the capacitor C3) through the capacitor C2, a parasitic diode of the transistor Q2 and the diode D4.

Alternatively, when the transistor Q1 is switched off and the transistor Q2 is switched on, a current flows from the capacitor C2 to the discharge lamp DL (and the capacitor C3) through the inductor L1, the diode D3 and the transistor Q2, so that electric energy is stored in the inductor L1. Subsequently, when the electric energy stored in the inductor L1 is released, a current flows from the inductor L1 to the discharge lamp DL (and the capacitor C3) through the capacitor C1, a parasitic diode of the transistor Q1 and the diode D3.

In the above-mentioned operation, when the transistor Q1 is switched on and off, the inductor L2 and the capacitor C3 configure a low-pass filter. Alternatively when the transistor Q2 is switched on and off, the inductor L1 and the capacitor C3 configure a low-pass filter. Thus, even though the switching frequency of the transistor Q1 is different from that of the transistor Q2, the characteristics of gain-frequency owing to the switching operations of the transistors Q1 and Q2 can be varied. Thus, it is possible to obtain substantially the same gain in the negative and positive phases of the current flowing in the discharge lamp DL, so that the contents of ripple in the current $I_{DL}$ flowing in the discharge lamp DL in the negative and positive phases become substantially the same.

Nineteenth Embodiment

Figure 41:
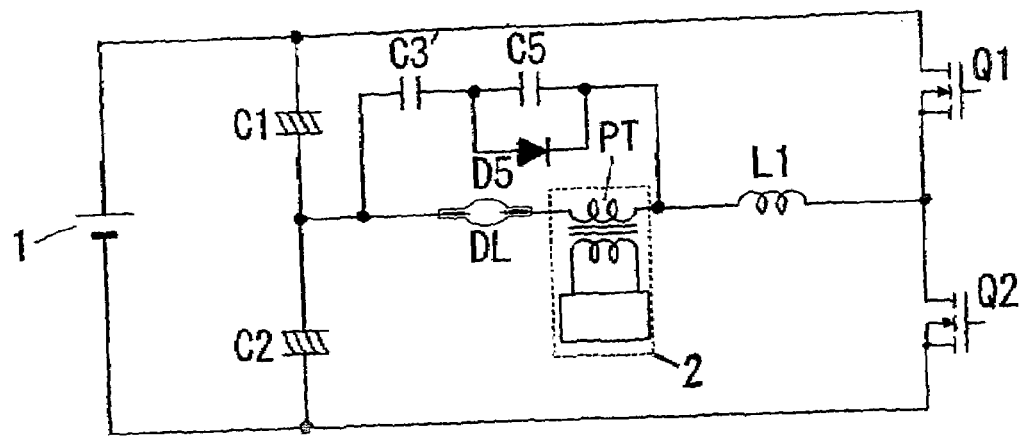
FIG. 41 is a circuit diagram of a lighting apparatus of high intensity discharge lamp in accordance with a nineteenth embodiment of the present invention.

A nineteenth embodiment of the present invention is described. FIG. 41 shows a configuration of a lighting apparatus of high intensity discharge lamp in accordance with the nineteenth embodiment.

In comparison with the seventeenth embodiment, the lighting apparatus in the nineteenth embodiment varies the capacitance of the capacitor C3 connected in parallel with the discharge lamp DL (see, for example, FIG. 1) corresponding to the negative and positive phases of the current flowing in the inductor L1.

As can be seen from FIG. 41, a parallel connection of a capacitor C5 1ns a diode D5 is connected between a capacitor C3' and the ignitor 2.

When the transistor Q2 is switched off and the transistor Q1 is switched on, a current flows from the capacitor C1 to the discharge lamp DL (and the capacitor C3) through the transistor Q1 and the inductor L1, so that electric energy is stored in the inductor L1. Subsequently, when the electric energy stored in the inductor L1 is released, a current flows from the inductor L1 to the discharge lamp DL (and the capacitor C3) through the capacitor C2 and a parasitic diode of the transistor Q2.

Alternatively, when the transistor Q1 is switched off and the transistor Q2 is switched on, a current flows from the capacitor C2 to the discharge lamp DL (and the capacitor C3) through the inductor L1 and the transistor Q2, so that electric energy is stored in the inductor L1. Subsequently, when the electric energy stored in the inductor L1 is released, a current flows from the inductor L1 to the discharge lamp DL (and the capacitor C3) through a parasitic diode of the transistor Q1 and the capacitor C1.

In the above-mentioned operation, when the transistor Q1 is switched on and off, the inductor L1 and the capacitors C3' and C5 configure a low-pass filter. Alternatively when the transistor Q2 is switched on and off, the inductor L1 and the capacitor C3' configure a low-pass filter. Thus, even though the switching frequency of the transistor Q1 is different from that of the transistor Q2, the characteristics of gain-frequency owing to the switching operations of the transistors Q1 and Q2 can be varied. Thus, it is possible to obtain substantially the same gain in the negative and positive phases of the current flowing in the discharge lamp DL, so that the contents of ripple in the current $I_{DL}$ flowing in the discharge lamp DL in the negative and positive phases become substantially the same.

Twentieth Embodiment

Figure 42:
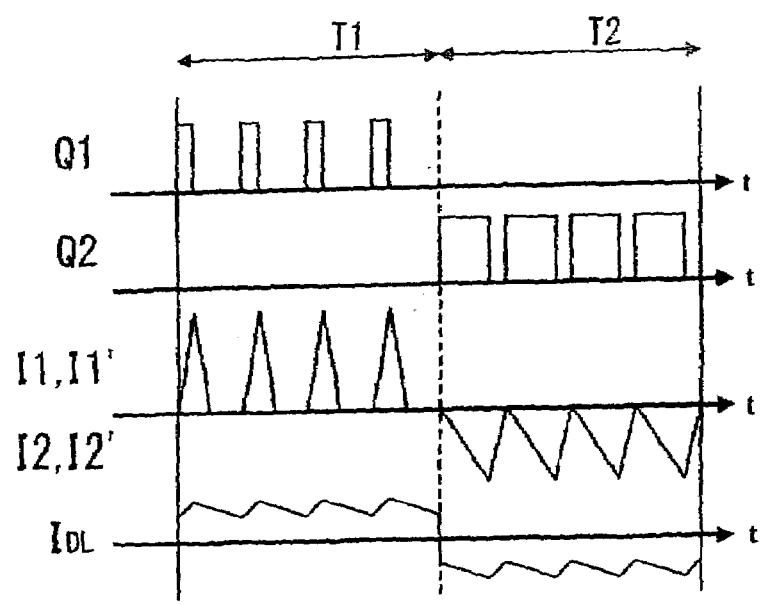
FIG. 42 is a timing chart showing motion of a lighting apparatus in accordance with a twentieth embodiment of the present invention.

A twentieth embodiment of the present invention is described. FIG. 42 shows timings of switching on and off of transistors Q1 and Q2, and waveforms of currents I1, I2 and $I_{DL}$ in accordance with the twentieth embodiment. The twentieth embodiment relates to the control method of the lighting apparatus, so that the illustration of the circuitry of the lighting apparatus is omitted.

As shown in FIG. 42, the lighting apparatus in the twentieth embodiment controls the currents I1 and I1' flowing in the capacitor C1 having the higher voltage Vc1 in DCM (Discontinuous Current Mode), and controls the currents I2 and I2' flowing in the capacitor C2 in the BCM. The DCM is a control by which the current is discontinuously flown.

By such controls, the switching frequency of the transistor Q1 is decreased to be substantially the same as the switching frequency of the transistor Q2. The width of on period of the transistor Q1 is made narrower, so that the current I1 and I1' flowing in the capacitor C1 is controlled in the DCM.

As a result, the switching frequencies of the transistors Q1 and q2 can be made substantially the same. Thus, it is possible to obtain substantially the same gain in the negative and positive phases of the current flowing in the discharge lamp DL, so that the contents of ripple in the current $I_{DL}$ flowing in the discharge lamp DL in the negative and positive phases become substantially the same.

Twenty-First Embodiment

Figure 43:
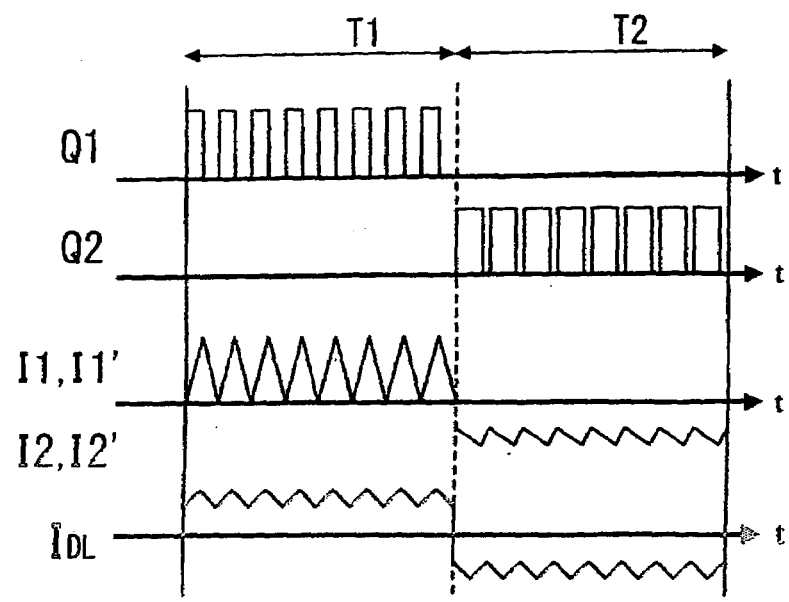
FIG. 43 is a timing chart showing motion of a lighting apparatus in accordance with a twenty-first embodiment of the present invention.

A twenty-first embodiment of the present invention is described. FIG. 43 shows timings of switching on and off of transistors Q1 and Q2, and waveforms of currents I1, I2 and $I_{DL}$ in accordance with the twenty-first embodiment. The twenty-first embodiment relates to the control method of the lighting apparatus, so that the illustration of the circuitry of the lighting apparatus is omitted.

As shown in FIG. 43, the lighting apparatus in the twenty-first embodiment controls the currents I2 and I2' flowing in the capacitor C2 having the lower voltage Vc2 in CCM (Continuous Current Mode), and controls the currents I1 and I1' flowing in the capacitor C1 in the BCM. The CCM is a control by which the current is continuously flown.

By such controls, the switching frequency of the transistor Q2 is increased to be substantially the same as the switching frequency of the transistor Q1. The width of on period of the transistor Q2 is made wider, so that the current I2 and I2' flowing in the capacitor C2 is controlled in the CCM.

As a result, the switching frequencies of the transistors Q1 and q2 can be made substantially the same. Thus, it is possible to obtain substantially the same gain in the negative and positive phases of the current flowing in the discharge lamp DL, so that the contents of ripple in the current $I_{DL}$ flowing in the discharge lamp DL in the negative and positive phases become substantially the same.

Twenty-Second Embodiment

Figure 44:
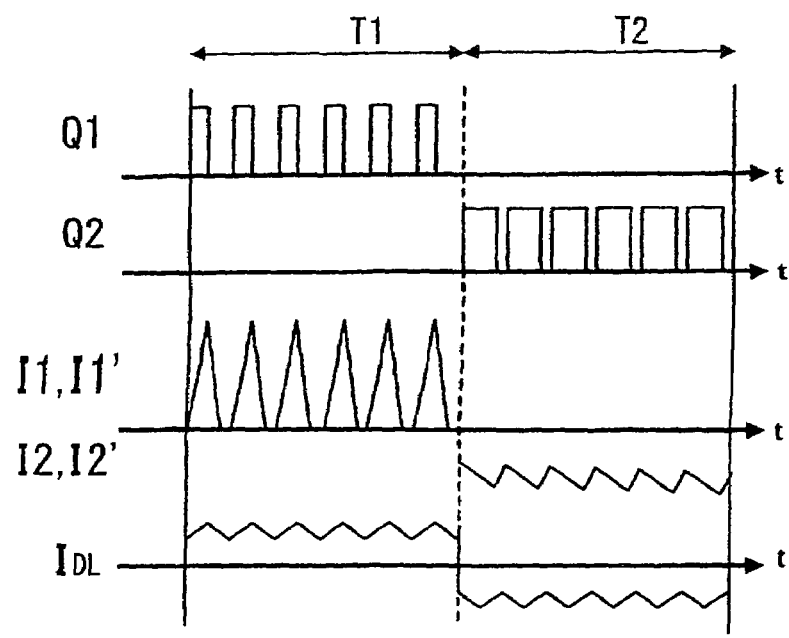
FIG. 44 is a timing chart showing motion of a lighting apparatus in accordance with a twenty-second embodiment of the present invention.

A twenty-second embodiment of the present invention is described. FIG. 44 shows timings of switching on and off of transistors Q1 and Q2, and waveforms of currents I1, I2 and $I_{DL}$ in accordance with the twenty-second embodiment. The twenty-second embodiment relates to the control method of the lighting apparatus, so that the illustration of the circuitry of the lighting apparatus is omitted.

As shown in FIG. 44, the lighting apparatus in the twenty-second embodiment controls the currents I1 and I1' flowing in the capacitor C1 having the higher voltage Vc2 in the DCM, and controls the currents I2 and I2' flowing in the capacitor C2 in the CCM.

By such controls, the switching frequency of the transistor Q1 is decreased and the switching frequency of the transistor Q2 is increased so as to make the switching frequencies of the transistors Q1 and Q2 be substantially the same. The width of on period of the transistor Q1 is made narrower, so that the current I1 and I1' flowing in the capacitor C1 is controlled in the DCM. The width of on period of the transistor Q2 is made wider, so that the current I2 and I2' flowing in the capacitor C2 is controlled in the CCM.

As a result, the switching frequencies of the transistors Q1 and q2 can be made substantially the same. Thus, it is possible to obtain substantially the same gain in the negative and positive phases of the current flowing in the discharge lamp DL, so that the contents of ripple in the current $I_{DL}$ flowing in the discharge lamp DL in the negative and positive phases become substantially the same.

Twenty-Third Embodiment

Figure 45:
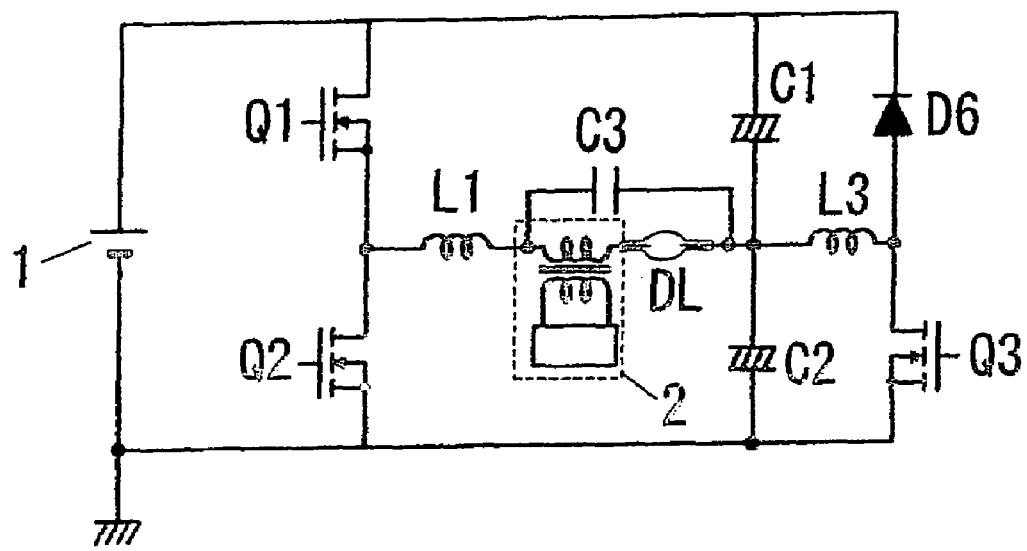
FIG. 45 is a circuit diagram of a lighting apparatus of high intensity discharge lamp in accordance with a twenty-third embodiment of the present invention.
Figure 46:
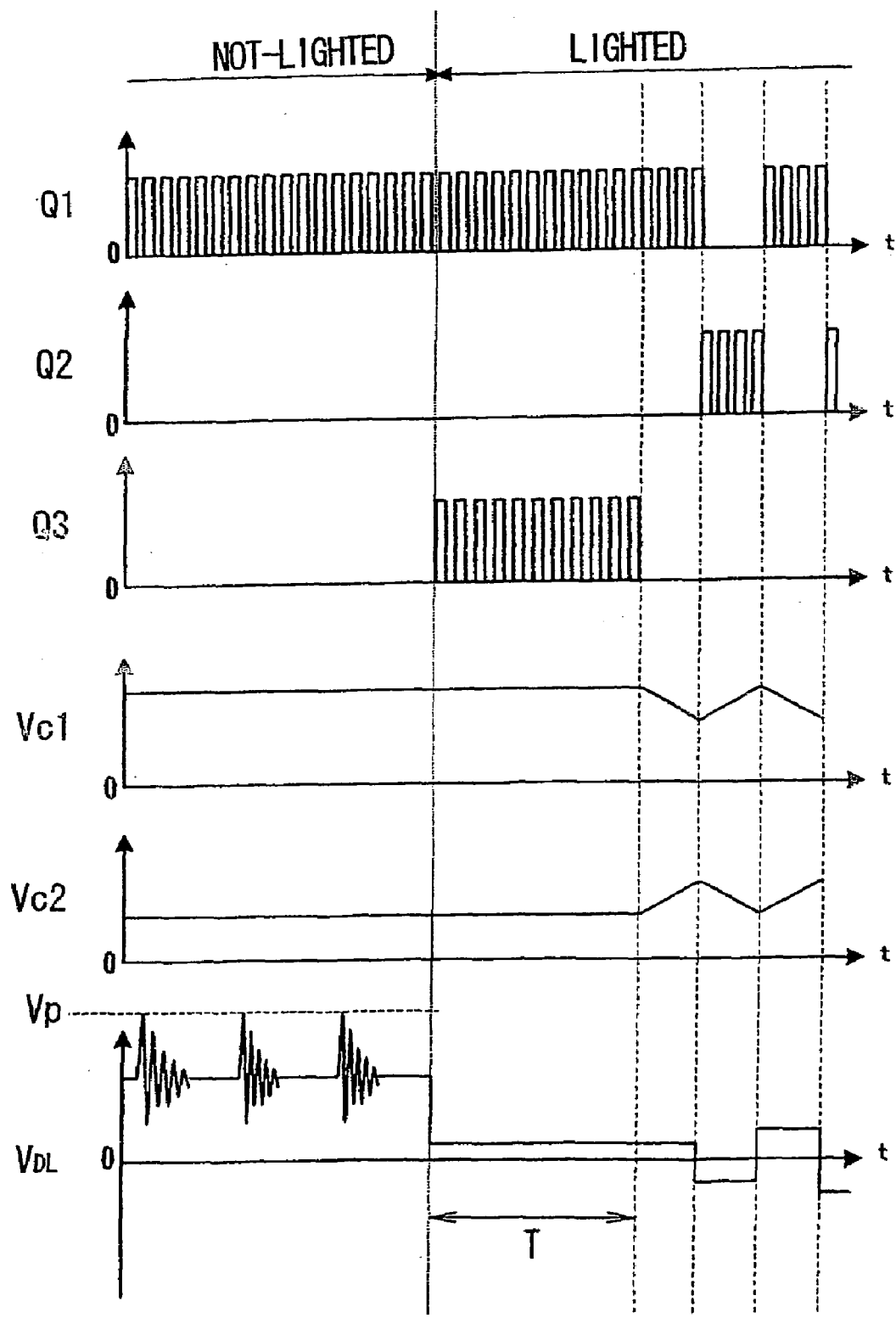
FIG. 46 is a timing chart showing motion of the lighting apparatus in the twenty-third embodiment.
Figure 47:
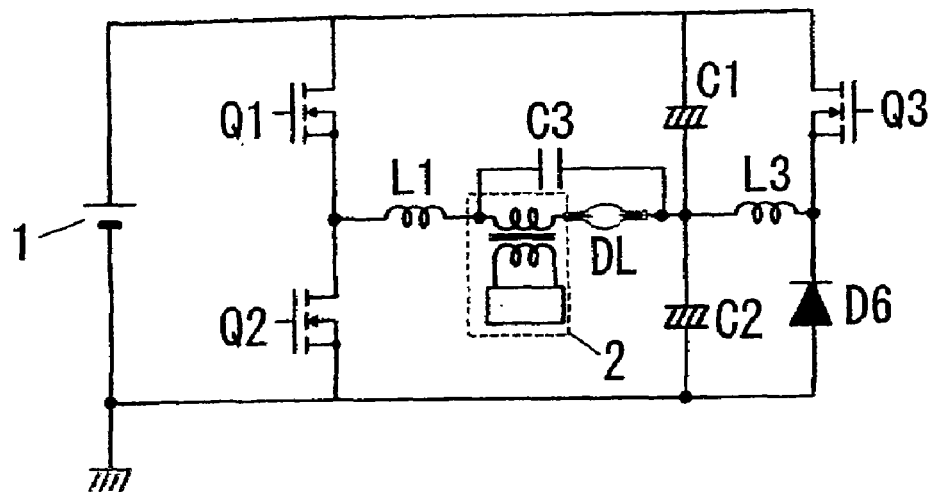
FIG. 47 is a circuit diagram of a modification of the lighting apparatus in the twenty-third embodiment.
Figure 48:
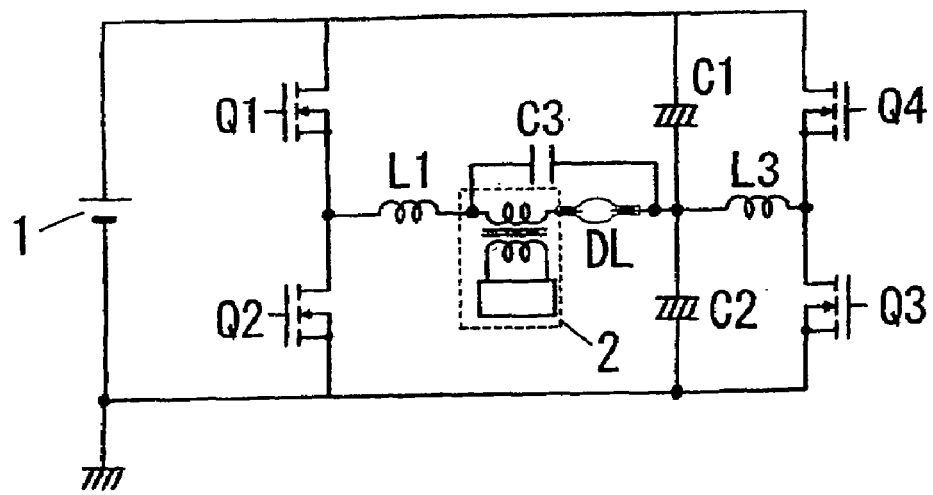
FIG. 48 is a circuit diagram of another modification of the lighting apparatus in the twenty-third embodiment.
Figure 49:
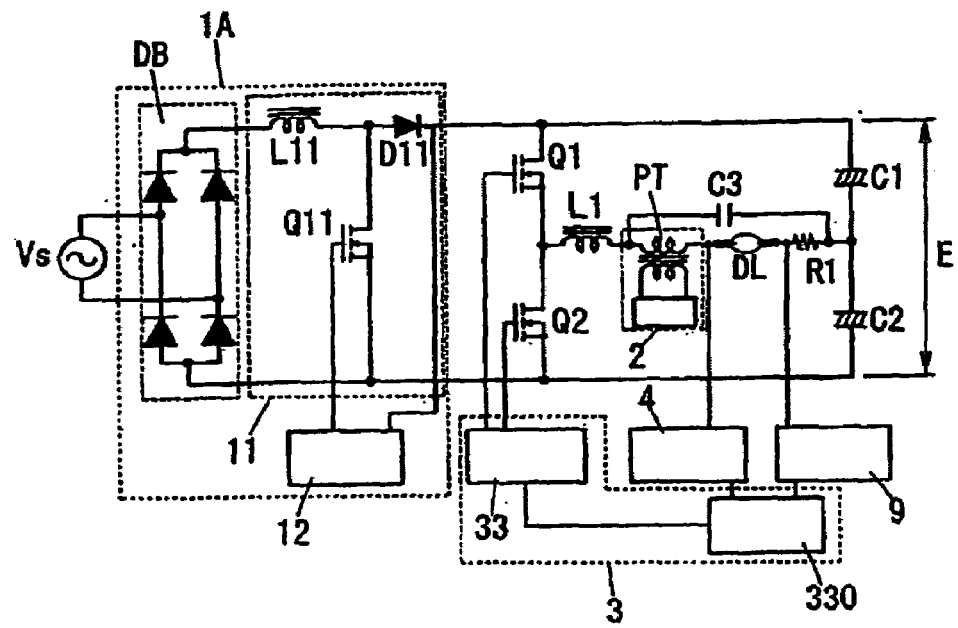
FIG. 49 is a circuit diagram of a conventional lighting apparatus of high intensity discharge lamp.
Figure 50:
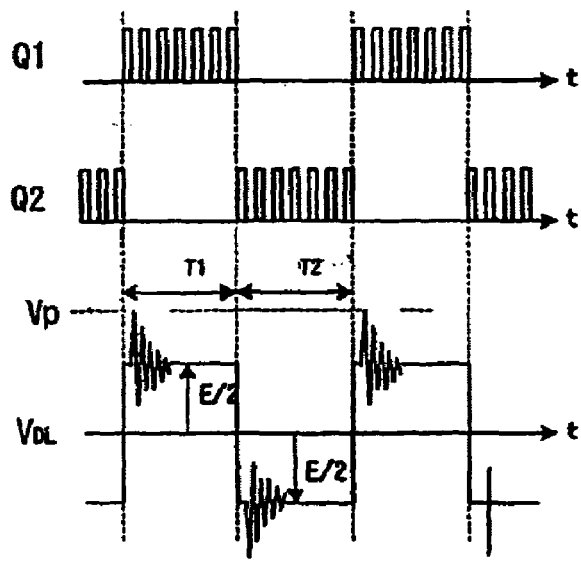
FIG. 50 is a timing chart showing motion of the conventional lighting apparatus.
Figure 51:
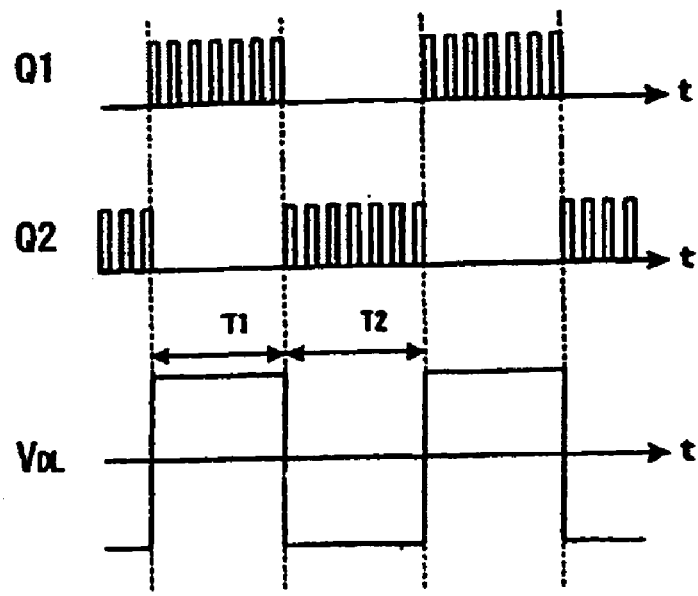
FIG. 51 is a timing chart showing motion of the conventional lighting apparatus.
Figure 52:
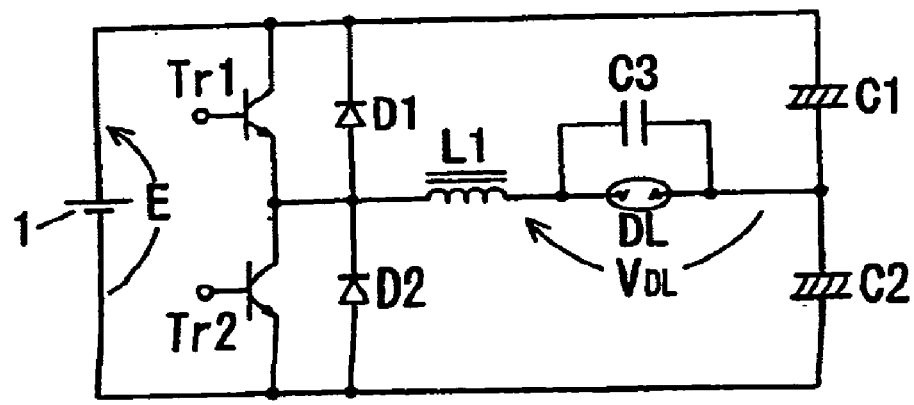
FIG. 52 is a circuit diagram of another conventional lighting apparatus of high intensity discharge lamp.
Figure 53:
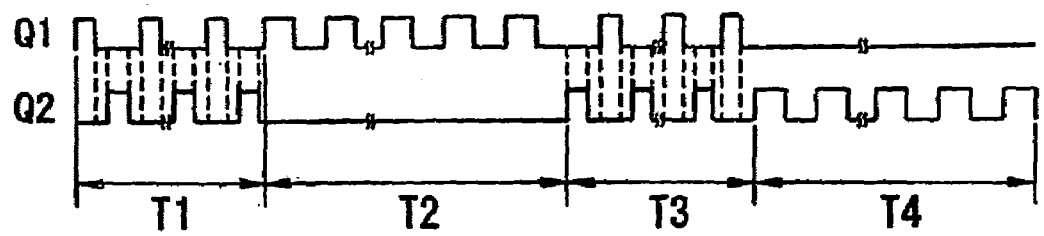
FIG. 53 is a timing chart showing motion of the conventional lighting apparatus.
Figure 54:
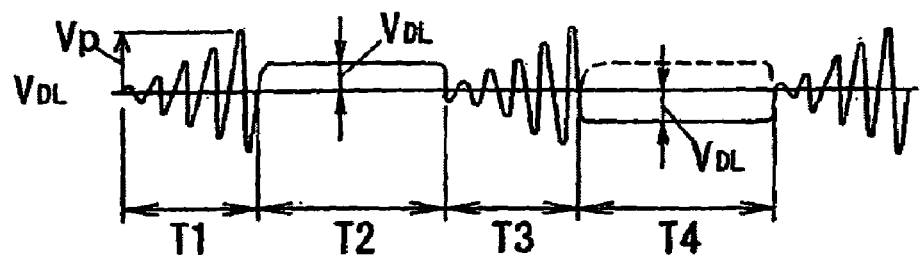
FIG. 54 is a timing chart showing motion of the conventional lighting apparatus.

A twenty-third embodiment of the present invention is described. FIG. 45 shows a configuration of a lighting apparatus of high intensity discharge lamp in accordance with the twenty-third embodiment. FIG. 46 shows timings of switching on and off of transistors Q1, Q2 and Q3, and waveforms of voltages Vc1, Vc2 and $V_{DL}$.

In comparison with FIGS. 1 and 45, the lighting apparatus in the twenty-third embodiment illustrated in FIG. 45 comprises a compensator for compensating the voltages Vc1 and Vc2 of the capacitors to predetermined voltages further to the configuration of the circuitry illustrated in FIG. 1.

The compensator is configured by a series connection of a transistor Q3 and a diode D6 which is connected in parallel with the series connection of the capacitors C1 and C2, and an inductor L3 connected between the connection point of the capacitors C1 and C2 and a connection point of the transistor Q3 and the diode D6. The diode D6 interdicts currents from the capacitors C1 and C2.

As can be seen from FIG. 46, the transistors Q2 and Q3 are always switched off, and the transistors Q1 is frequently switched on and off in a high frequency by a control circuit not illustrated in FIG. 45 while the discharge lamp DL has not been lighted. As a result, the voltage $V_{DL}$ having the waveform that the high frequency and high voltage alternating voltages owing to the ignitor 2 are superimposed on the voltage Vc1 between the terminals of the capacitor C1 is applied to the discharge lamp DL.

This application is based on Japanese patent application 2003-98014 filed Apr. 1, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

INDUSTRIAL APPLICABILITY

As mentioned above, the lighting apparatus of high intensity discharge lamp in accordance with the present invention can prevent the increase of the stresses or upsizing of the elements can be prevented, and can make the transition from glow discharge to arc discharge after lighting the discharge lamp smoothly.

The invention claimed is:

1. A lighting apparatus of high intensity discharge lamp comprising:
   a DC power source;
   a series connection of a first switch and a second switch;
   a series connection of a first capacitor and a second capacitor which is connected in parallel with the series connection of the first switch and the second switch, each of the first capacitor and the second capacitor having two terminals, a voltage between both terminals of the first capacitor being selected to be different from a voltage between both terminals of the second capacitor so that the higher of the voltage between both terminals of the first capacitor and the voltage between both terminals of the second capacitor becomes at least equal to a voltage which is necessary for lighting the discharge lamp;
   a series connection including at least an inductor and a high intensity discharge lamp connected between a connection point of the first switch and the second switch and another connection point of the first capacitor and the second capacitor;
   a third capacitor connected in parallel with the high intensity discharge lamp; and
   a control circuit for switching on and off of the first switch and the second switch so as to supply electric power to the discharge lamp.

2. The lighting apparatus of high intensity discharge lamp in accordance with claim 1, wherein
   the voltages between both terminals of the first capacitor and both terminals of the second capacitor are set to be different from each other while at least the discharge lamp has not been lighted.

3. The lighting apparatus of high intensity discharge lamp in accordance with claim 1, wherein
   the voltages between both terminals of the first capacitor and both terminals of the second capacitor are set to be different from each other owing to selecting capacitances of the first capacitor and the second capacitor different from each other, and
   values of the capacitances of the first capacitor and the second capacitor are selected in a manner so that a ratio of division of the larger value of the capacitance with respect to the other is in a region from 1.6 to 15.

4. The lighting apparatus of high intensity discharge lamp in accordance with claim 3, wherein
   a lower value of the voltages between both terminals of the first capacitor and both terminals of the second capacitor is at least equal to a rated voltage of the high intensity discharge lamp.

5. The lighting apparatus of high intensity discharge lamp in accordance with claim 3, wherein
   a higher value of the voltages between both terminals of the first capacitor and both terminals of the second capacitor is in a range from at least equal to 250V to at most equal to 450V.

6. The lighting apparatus of high intensity discharge lamp in accordance with claim 1, wherein
   output voltage from the DC power supply is in a range from at least equal to 300V to at most equal to 480V.

7. The lighting apparatus of high intensity discharge lamp in accordance with claim 1, wherein
   a switching frequency of one of the first switch and the second switch which is connected to one of the first capacitor and the second capacitor having the higher voltage between both terminals thereof is higher than that of the other of the first switch and the second switch while the high intensity discharge lamp has been lighted.

8. The lighting apparatus of high intensity discharge lamp in accordance with claim 7, wherein
   the higher switching frequency is an integral multiple of the switching frequency of the other.

9. The lighting apparatus of high intensity discharge lamp in accordance with claim 2, wherein
   a magnitude relation between the voltages between both terminals of the first capacitor and both terminals of the second capacitor are alternately changed while the high intensity discharge lamp has not been lighted.

10. The lighting apparatus of high intensity discharge lamp in accordance with claim 1, wherein
    the first switch and the second switch are switched on and off in a manner so that a frequency of rectangular alternating voltage component applied to the high intensity discharge lamp in a predetermined term after starting up of lighting of the high intensity discharge lamp is made lower than the frequency of the rectangular alternating voltage component after passing the predetermined term.

11. The lighting apparatus of high intensity discharge lamp in accordance with claim 10, wherein
    the frequency of the rectangular alternating voltage component is selected to be a value by which no acoustic resonance occurs in the high intensity discharge lamp.

12. The lighting apparatus of high intensity discharge lamp in accordance with claim 10, wherein
    the frequency of the rectangular alternating voltage component in the predetermined term is in a range from 0 to several tens Hz.

13. The lighting apparatus of high intensity discharge lamp in accordance with claim 10, wherein
    the frequency of the rectangular alternating voltage component in the predetermined term is an inverse number of a time necessary for roundly varying the voltage of at least one of the terminals of the first capacitor and the second capacitor between higher voltage and lower voltage of the first capacitor and the second capacitor while the discharge lamp has not been lighted.

14. The lighting apparatus of high intensity discharge lamp in accordance with claim 10, wherein
    the frequency of the rectangular alternating voltage component in the predetermined term is an inverse number of a time necessary for roundly varying the voltage of at least one of the terminals of the first capacitor and the second capacitor between a largest voltage applicable to the first capacitor and the second capacitor and a voltage which is a subtraction of the largest value from the output voltage from the DC power supply.

15. The lighting apparatus of high intensity discharge lamp in accordance with claim 10, wherein
    the frequency of the rectangular alternating voltage component in the predetermined term is an inverse number of a time necessary for roundly varying the voltage of at least one of the terminals of the first capacitor and the second capacitor between a predetermined voltage and a voltage which is a subtraction of the predetermined value from the output voltage from the DC power supply.

16. The lighting apparatus of high intensity discharge lamp in accordance with claim 1, wherein
a low frequency rectangular alternating electric power supplied to the high intensity discharge lamp is controlled by switching on and off the first switch and the second switch utilizing sensing results of the voltage between the terminals of the high intensity discharge lamp and the voltage between the terminals of at least one of the first capacitor and the second capacitor.

17. The lighting apparatus of high intensity discharge lamp in accordance with claim 16, wherein
the sensing result of the voltage between the terminals of the high intensity discharge lamp is utilized in a half period of the low frequency rectangular alternating electric power supplied to the high intensity discharge lamp, and the sensing result of the voltage between the terminals of at least one of the first capacitor and the second capacitor is utilized in the rest half period.

18. The lighting apparatus of high intensity discharge lamp in accordance with claim 1, wherein
the output voltage from the DC power source is varied corresponding to the voltage between the terminals of the high intensity discharge lamp.

19. The lighting apparatus of high intensity discharge lamp in accordance with claim 1, wherein
the DC power source comprises a rectifier for rectifying AC current of an AC power source to DC current; and
the output voltage from the DC power supply is varied corresponding to an input voltage from the AC power source.

20. The lighting apparatus of high intensity discharge lamp in accordance with claim 1, further comprising:
a compensator that compensates a gain with respect to one of negative and positive phases of AC current flowing in the inductor to be substantially equal to a gain with respect to the other of the negative and positive phases of AC current flowing in the inductor,
wherein a current flowing in the inductor is controlled in BCM (Boundary Current Mode), and
wherein the inductor and the third capacitor configure a filter.

21. The lighting apparatus of high intensity discharge lamp in accordance with claim 20, wherein
the compensator is configured by a fourth capacitor connected between a first connection point of the first switch and the second switch and a second connection point of the first capacitor and the second capacitor, and a second inductor connected between the fourth capacitor and one of the first connection point and the second connection point.

22. The lighting apparatus of high intensity discharge lamp in accordance with claim 20, wherein
the compensator varies an inductance value of the inductor corresponding to negative and positive phases of the AC current flowing in the inductor.

23. The lighting apparatus of high intensity discharge lamp in accordance with claim 20,
wherein the compensator varies a capacitance value of the third capacitor corresponding to negative and positive phases of the AC current flowing in the inductor.

24. The lighting apparatus of high intensity discharge lamp in accordance with claim 1, wherein
a series connection of a third switch and a diode is connected in parallel with the series connection of the first capacitor and the second capacitor in a manner so that a current from the first capacitor or the second capacitor to the third switch is interdicted by the diode; and
a third inductor is connected between a first connection point of the first capacitor and the second capacitor and a second connection point of the third switch and the diode.

25. The lighting apparatus of high intensity discharge lamp in accordance with claim 1, wherein
a series connection of a third switch and a fourth switch is connected in parallel with the series connection of the first capacitor and the second capacitor; and
a third inductor is connected between a first connection point of the first capacitor and the second capacitor and a second connection point of the third switch and the fourth switch.

* * * * *